(12) United States Patent
Izumi

(10) Patent No.: US 7,853,151 B2
(45) Date of Patent: Dec. 14, 2010

(54) OPTICAL COMMUNICATION SYSTEM, METHOD, AND OPTICAL TRANSMITTING STATION

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 893 days.

(21) Appl. No.: 11/189,810

(22) Filed: Jul. 27, 2005

(65) Prior Publication Data
US 2006/0222371 A1    Oct. 5, 2006

(30) Foreign Application Priority Data
Mar. 29, 2005    (JP)    ............... 2005-096280

(51) Int. Cl.
H04B 10/00    (2006.01)
H04J 14/06    (2006.01)
(52) U.S. Cl. ........................ 398/159; 398/65
(58) Field of Classification Search ................ 398/152, 398/168, 169, 170, 184, 205, 206
See application file for complete search history.

(56) References Cited

U.S. PATENT DOCUMENTS

| | | | | |
|---|---|---|---|---|
| 3,584,220 A | * | 6/1971 | Nomura et al. | 398/168 |
| 4,879,763 A | * | 11/1989 | Wood | 398/168 |
| 5,430,795 A | * | 7/1995 | Taga et al. | 398/192 |
| 5,710,648 A | * | 1/1998 | Frigo | 398/108 |
| 6,583,903 B1 | * | 6/2003 | Way et al. | 398/152 |
| 6,768,875 B1 | | 7/2004 | Eiselt et al. | |
| 6,823,142 B1 | * | 11/2004 | Tanaka et al. | 398/152 |
| 2002/0060760 A1 | | 5/2002 | Weiner | |

FOREIGN PATENT DOCUMENTS

| | | |
|---|---|---|
| JP | 44-24202 A | 10/1969 |
| JP | 5-313095 A | 11/1993 |
| JP | 7-221705 | 8/1995 |
| JP | 8-54525 | 2/1996 |
| JP | 9-162792 A | 6/1997 |

OTHER PUBLICATIONS

European Search Report and Annex dated Jul. 26, 2006 of Application No. EP 05 01 6175.
Japanese Office Action mailed on Feb. 9, 2010, issued in Japanese Patent Application No. 2005-96280 (Partial English language translation provided).

* cited by examiner

Primary Examiner—Nathan M Curs
(74) Attorney, Agent, or Firm—Fujitsu Patent Center

(57) ABSTRACT

In an optical communication system, a pre-compensation is conducted for an influence of a polarization dispersion and a polarization dependent loss, which an optical signal transmitted from a transmitter station to a receiver station receives from a communication channel, at a transmitter station. The influence of the polarization dispersion and the polarization dependent loss from the transmission channel is cancelled when the receiver station receives the optical signal.

13 Claims, 38 Drawing Sheets

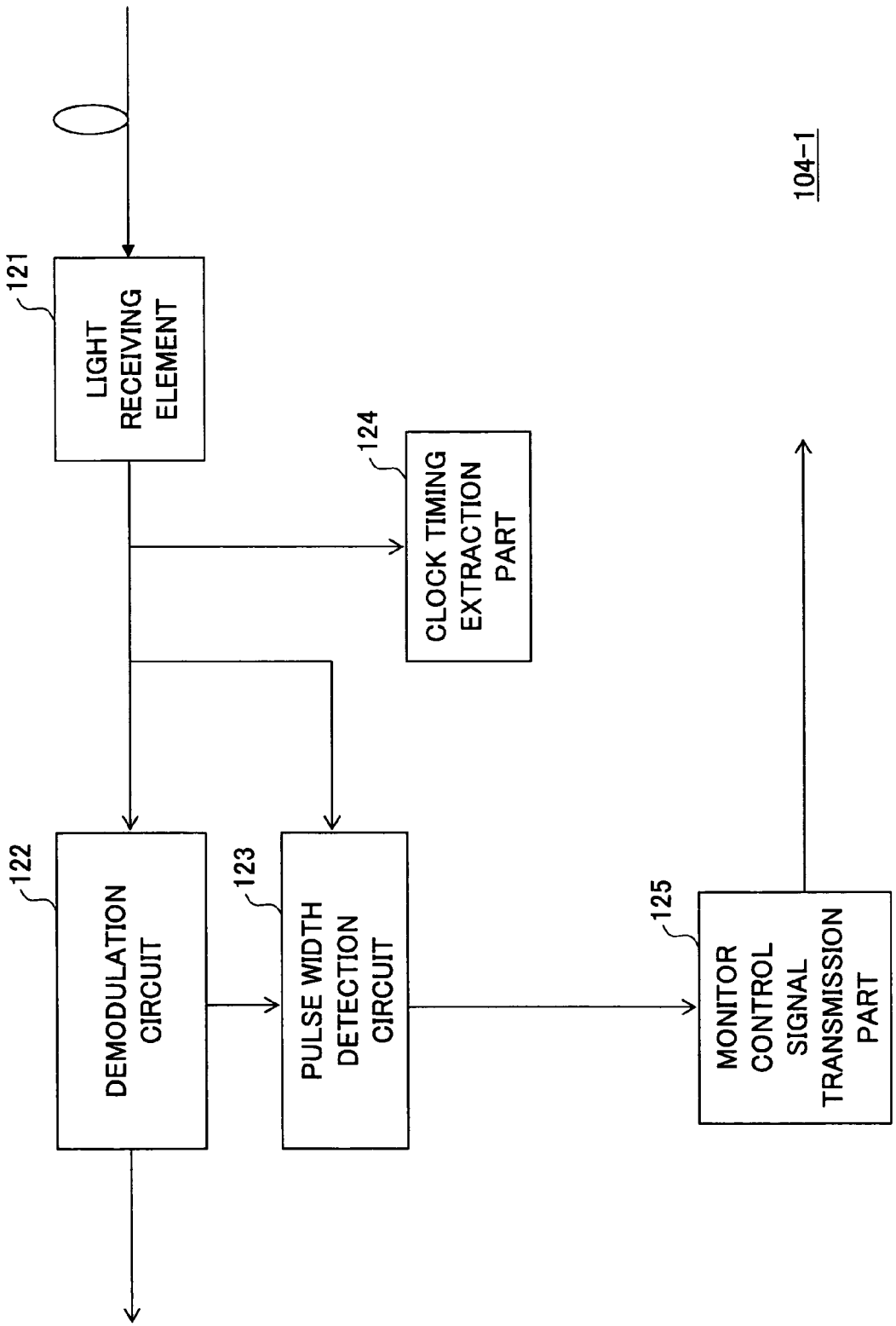

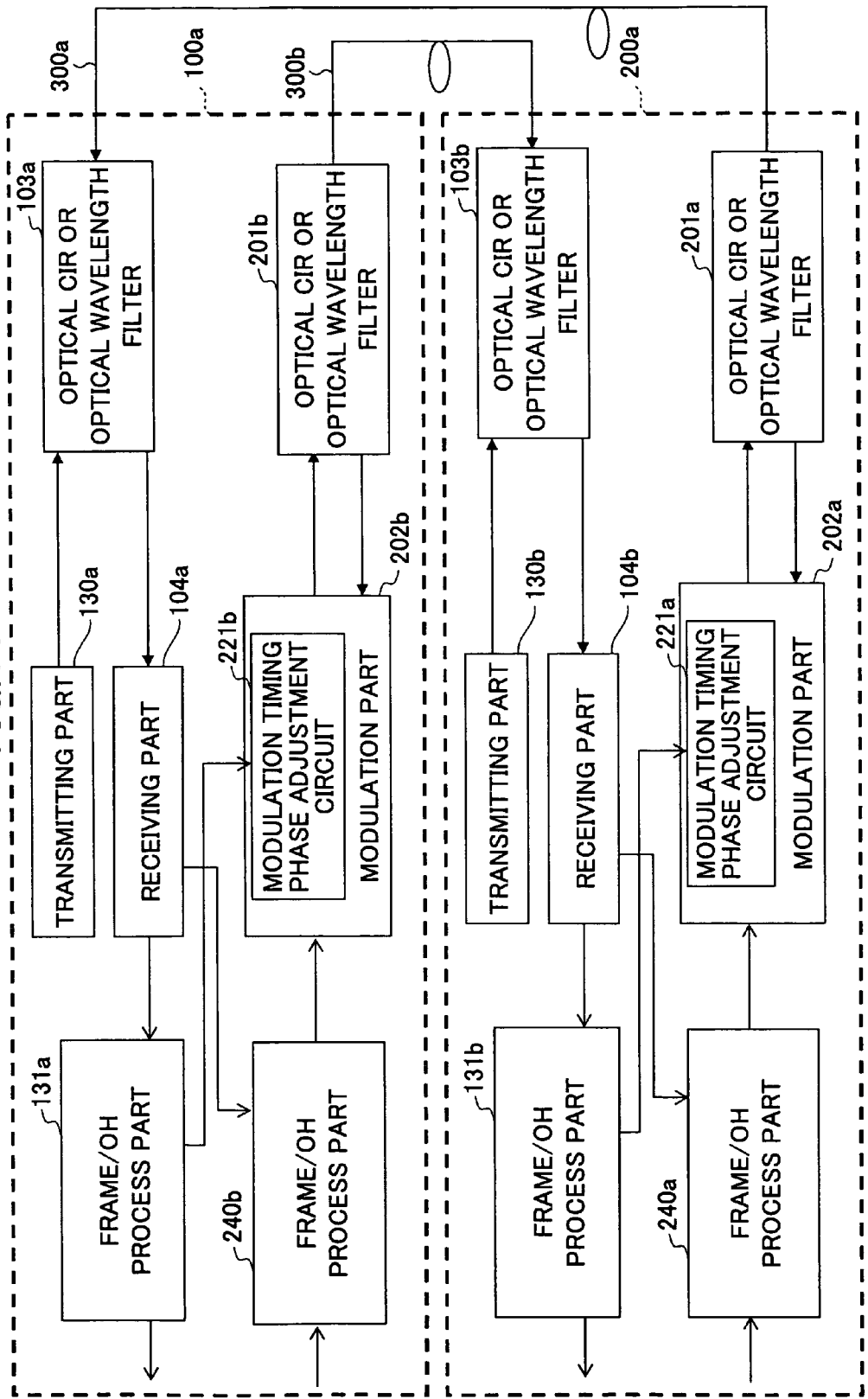

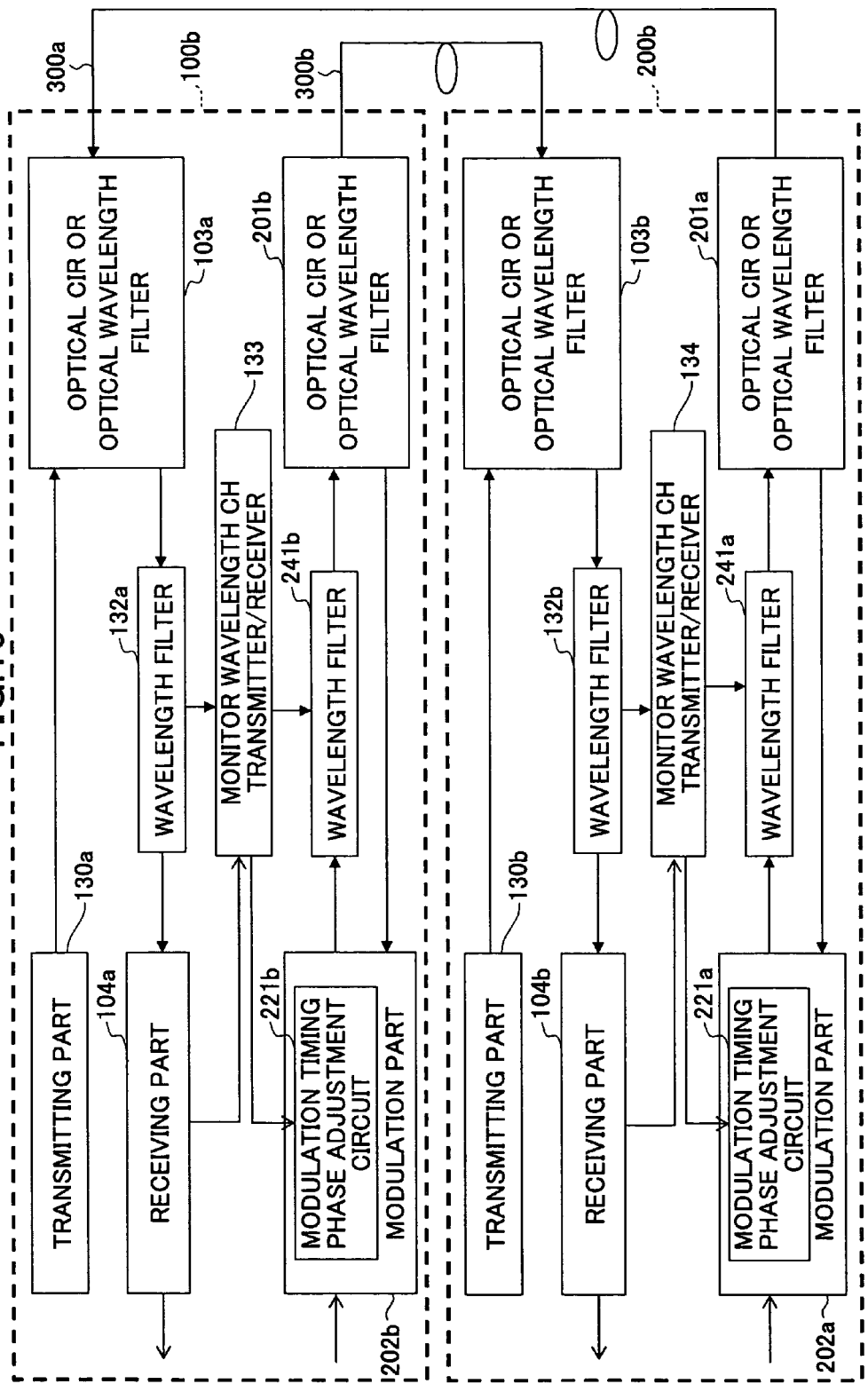

1 TIME SLOT WIDTH
OF RZ CODE

PMD
WAVEFORM
DETERIORATION

OPTIMUM
TIMING FOR
ON/OFF
MODULATORS

OPTIMUM
TIMING FOR
ON/OFF
MODULATORS

OPTICAL COMMUNICATION SYSTEM, METHOD, AND OPTICAL TRANSMITTING STATION

BACKGROUND OF THE INVENTION

1. Field of the Invention

The present invention generally relates to optical communication systems, transmission deterioration compensation methods, optical transmission systems, and optical receiving systems, and more particularly to an optical communication system, a transmission deterioration compensation method, an optical transmission system, and an optical receiving system, which a transmission deterioration of an optical signal is compensated.

2. Description of the Related Art

For example, in an optical communication system, a WDM (Wavelength Division Multiplexing), which is a method for multiplexing a plurality of data signals having different wavelengths into a single optical fiber, has been used. The WDM (Wavelength Division Multiplexing) conducts a multiplex transmission with an optical signal by utilizing a plurality of optical beams having different wavelengths as a carrier in that an optical coupler (multiplexer) is arranged at a transmission side of the optical fiber and an optical branching filter (demultiplexer) is arranged at a receiver side of the optical fiber.

Recently, in optical communication systems, the WDM, in which a modulation rate is 10 Gbps for each wavelength, is in practical use. In order to further extend a transmission capacity, a WDM having 40 Gbps or 80 Gbps of the modulation rate for each wavelength is further required.

However, in an optical communication system for transmitting an optical signal of the modulation rate exceeding 40 Gbps, a transmission deterioration of a distortion of a waveform of the optical signal caused by a polarization mode dispersion (PMD) and a polarization dependent loss (PDL), which are rarely problems in the meantime, becomes a problem.

The polarization dispersion causes the distortion of the waveform of the optical signal. On the other hand, in general, the polarization mode loss rarely becomes a problem. However, when the polarization mode loss is accumulated, a polarization direction of the optical signal fluctuates. Accordingly, a level of the optical signal fluctuates due to an optical circuit from a light emitting element to a light receiving element, and polarization dependence.

In a conventional optical communication system, a method for compensating the polarization dispersion of the optical signal after a transmission at a previous stage of a receiving part by arranging a PMD/PDL compensator at a receiver side (for example, refer to Japanese Laid-open Patent Application No. 7-221705), a method for replacing a transmission itself with a special optical fiber, which does not cause the polarization dispersion, (for example, refer to Japanese Laid-open Patent Application No. 8-54525) and a like are used.

FIG. 1 is a diagram showing a system configuration example of an optical communication system for transmitting a single wavelength with a single optical fiber. In an optical communication system in FIG. 1, a terminal station A and a terminal station B are connected to each other via a relay station A and a relay station B. Each of the terminal station A and the terminal station B includes an optical transmitting system for transmitting an optical signal and an optical receiving system for receiving the optical signal.

Each optical receiving system of the terminal station A and the terminal station B includes a PMD compensation means for compensating a polarization dispersion, and a PDL compensation means (for example, an optical amplifier for conducting an output constant control) for compensating a polarization dependent loss. However, the optical communication system in FIG. 1 has a problem in that a receiver side is required to always measure a change of a polarization state and complicatedly control the PMD compensation means and the PDL compensation means.

FIG. 2 is a diagram showing a system configuration example of an optical communication system for transmitting dual wavelengths with a single optical fiber. FIG. 3 is a diagram showing a configuration example of a dual wavelength WDM multiplexer. Similar to the optical communication system in FIG. 1, in the optical communication system in FIG. 2, a terminal station A and a terminal station B are connected to each other via a relay station A and the relay station B.

Each of the terminal station A and the terminal station B has the dual wavelength WDM multiplexer shown in FIG. 3. In the dual wavelength WDM multiplexer, a PMD/PDL compensator for compensating the polarization dispersion and the polarization dependent loss is arranged for each wavelength at the receiver side.

However, in the optical communication system in FIG. 2, it is required to arrange the PMD/PDL compensator for each wavelength at every predetermined distance. However, in an optical communication system having a modulation rate of 40 Gbps or 80 Gbps for a single wavelength, compared to the optical communication system of 10 Gbps, a system cost is expensive. Accordingly, it is difficult to arrange the PMD/PDL compensator for each wavelength at every predetermined distance. In addition, there is a problem in that a setting of an optical fiber for a transmission channel is further expensive.

Moreover, in a case in that the polarization state rapidly changes, since the optical communication system is required to follow the change of the polarization state and control the polarization dependent loss, disadvantageously, the receiver side is required to measure the change of the polarization state for each wavelength and complicatedly control the PMD/PDL compensator.

SUMMARY OF THE INVENTION

It is a general object of the present invention to provide optical communication systems, transmission deterioration compensation methods, optical transmission systems, and optical receiving systems, in which the above-mentioned problems are eliminated.

A more specific object of the present invention is to provide an optical communication system, a transmission deterioration compensation method, an optical transmission system, and an optical receiving system, in which polarization dispersion and polarization dependent loss can be easily and inexpensively compensated.

More specific object of the present invention is to provide an optical communication system, in which a pre-compensation is conducted for an influence of a polarization dispersion and a polarization dependent loss, which an optical signal transmitted from a transmitter station to a receiver station receives from a communication channel, at a transmitter station; and the influence of the polarization dispersion and the polarization dependent loss from the transmission channel is cancelled when the receiver station receives the optical signal.

In the present invention in one preferred mode, the transmitter station conducts the pre-compensation for the polarization dispersion and the polarization dependent loss so that the influence of the polarization dispersion and the polarization dependent loss is canceled when the optical signal is received at the receiver station. The optical signal transmitted from the transmitter station to the receiver station propagates through the transmission channel where the polarization dispersion and the polarization dependent loss are caused, and is influenced with the polarization dispersion and the polarization dependent loss. Accordingly, in the preset invention in one preferred mode, the pre-compensation is conducted for the polarization dispersion and the polarization dependent loss caused by the transmission channel, at a transmitter side. Therefore, the optical signal is influenced with the polarization dispersion and the polarization dependent loss when the optical signal is transmitted from the transmitter station to the receiver station, and the influence of the polarization dispersion and the polarization dependent loss are cancelled.

BRIEF DESCRIPTION OF THE DRAWINGS

Other objects, features and advantages of the present invention will become more apparent from the following detailed description when read in conjunction with the accompanying drawings, in which:

FIG. 13 is a diagram showing a first configuration of the receiving part included in the receiver station according to the first embodiment of the present invention;

FIG. 14 is a diagram showing a first variation of the system configuration of the optical communication system including a counter terminal station according to the first embodiment of the present invention;

FIG. 15 is a diagram showing a second variation of the configuration of the optical communication system including the opposite terminal station, according to the first embodiment of the present invention;

DESCRIPTION OF THE PREFERRED EMBODIMENTS

Figure 1:
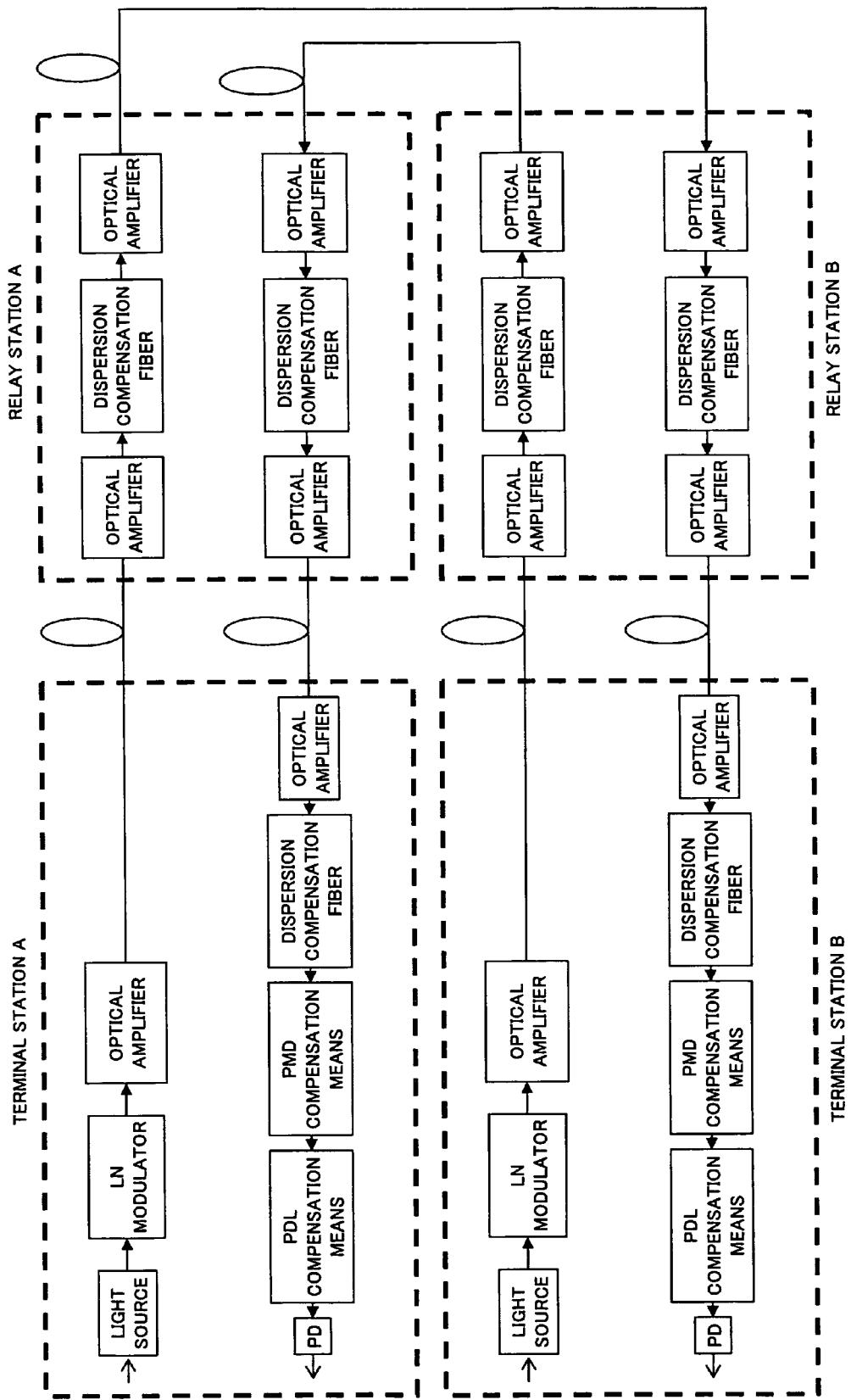
FIG. 1 is a diagram showing a system configuration example of an optical communication system for transmitting a single wavelength with a single optical fiber.
Figure 2:
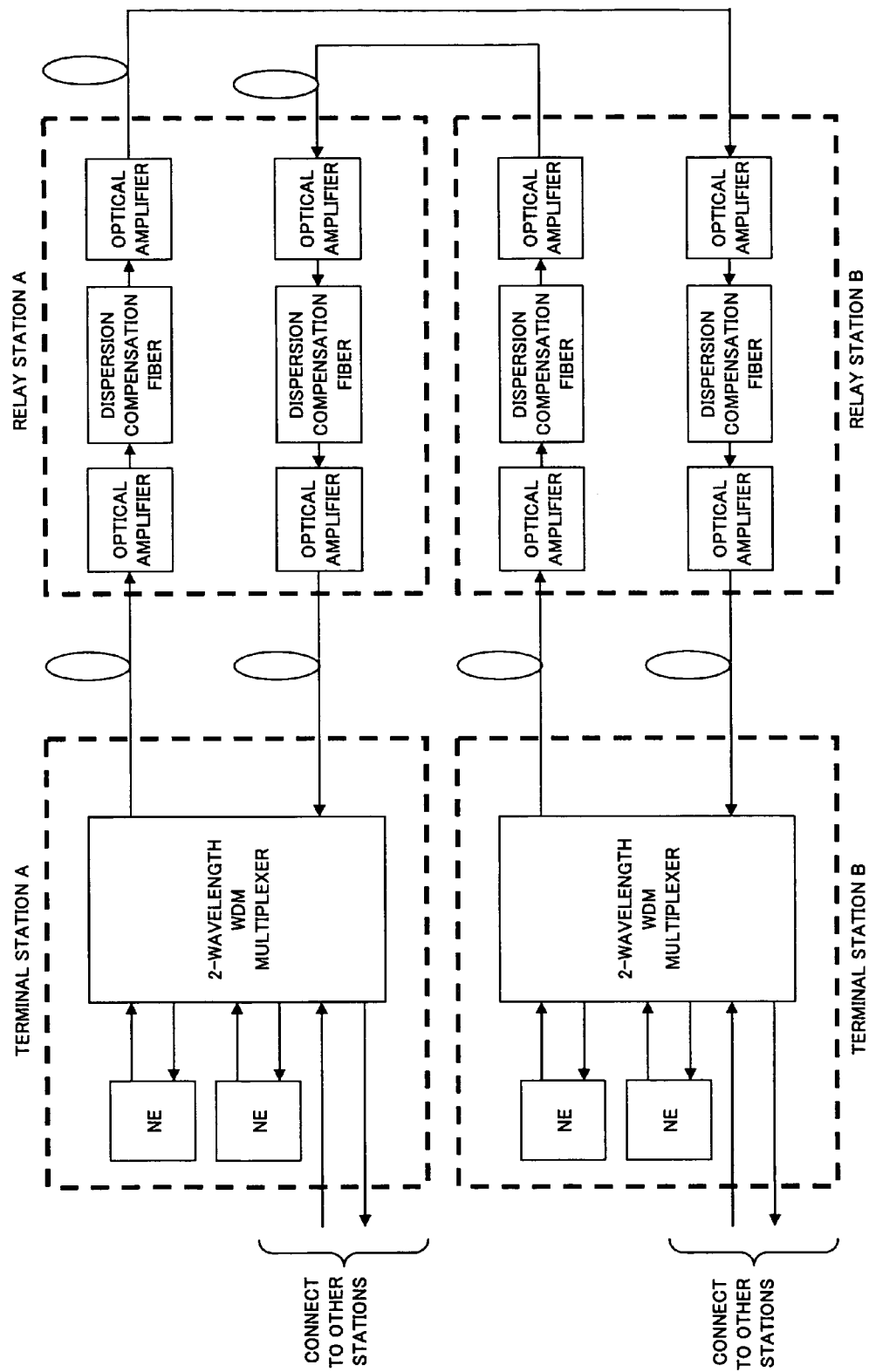
FIG. 2 is a diagram showing a system configuration example of an optical communication system for transmitting dual wavelengths with a single optical fiber.
Figure 3:
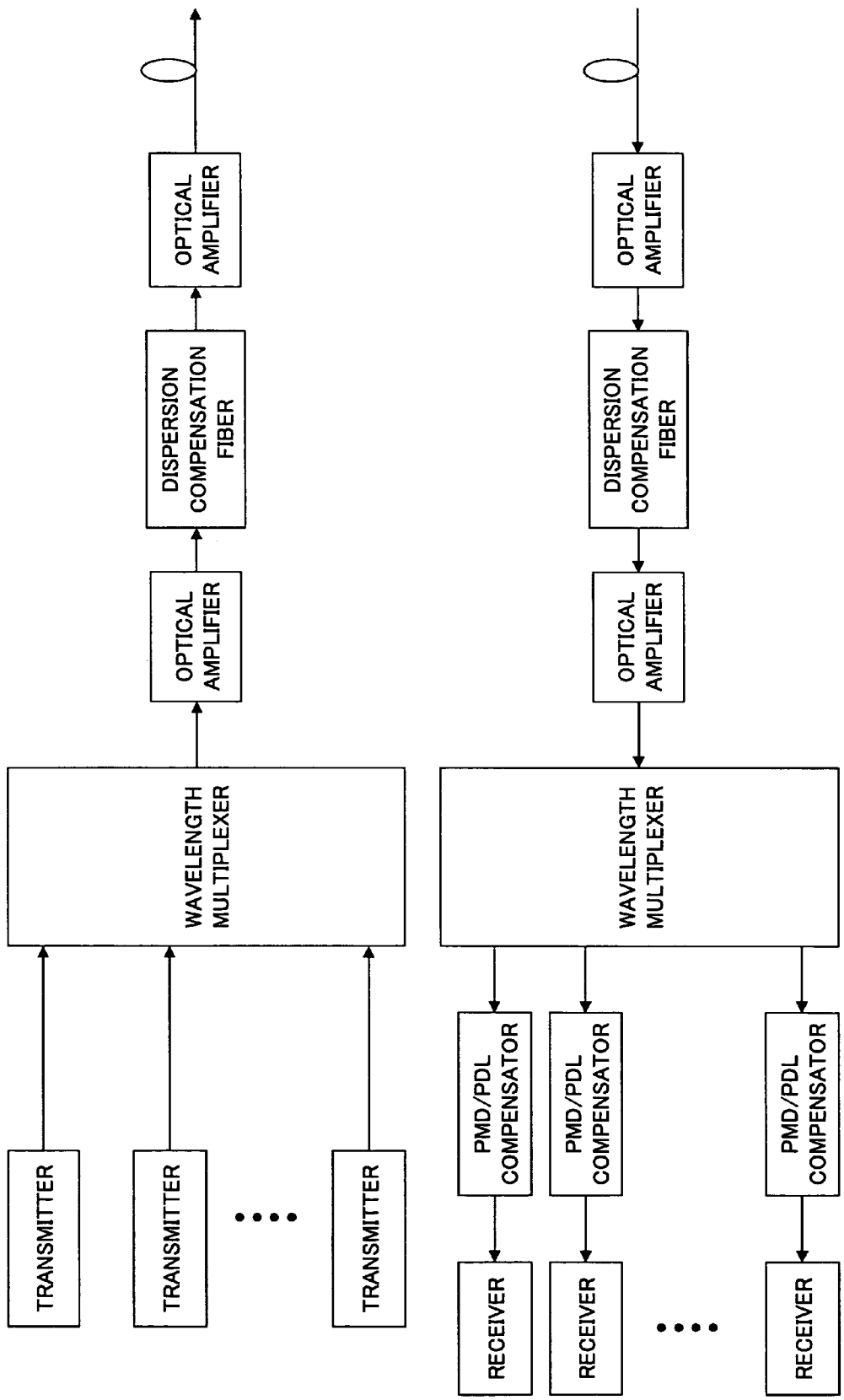
FIG. 3 is a diagram showing a configuration example of a dual wavelength WDM multiplexer.
Figure 4:
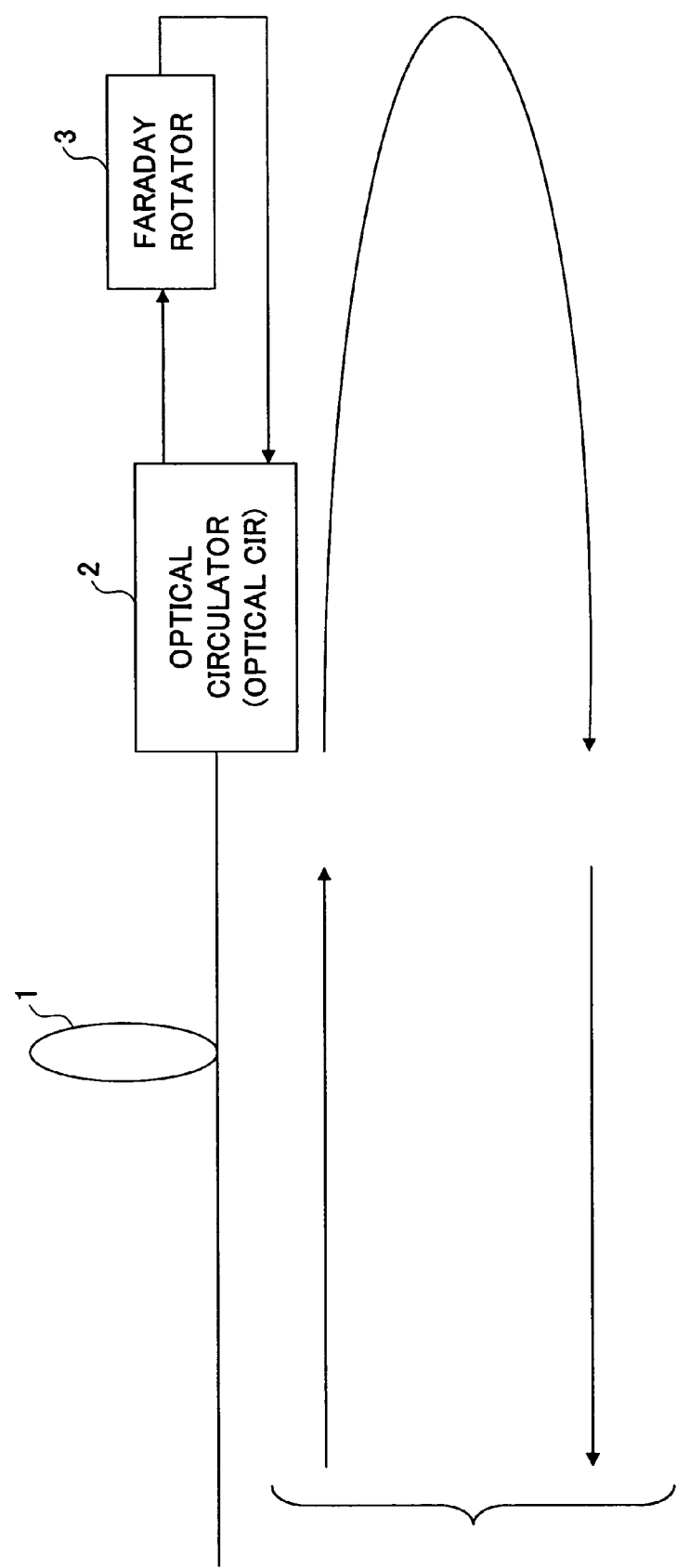
FIG. 4 is a diagram for explaining a principle of the present invention.

Embodiments according to the present invention will be described with reference to the accompanying drawings. FIG. 4 is a diagram for explaining a principle of the present invention. A transmission channel 1 is a waveguide which causes for example, polarization dispersion and a polarization dependent loss. When a polarization direction in which an optical signal is entered the transmission channel 1 is assumed to be a linear polarization, a polarization angle of the optical signal becomes different dependently on a polarization angle.

However, if a polarization angle where a transmission rate is minimized and a polarization angle where the transmission rate is maximized are considered as two separate factors, a polarization plane is rotated due to a displacement of the optical signal with respect to a polarization axis while the optical signal propagates the transmission channel 1.

In addition, an eccentricity ratio of the optical fiber, and an angle surface, on which a major axis and a minor axis are perpendicular to each other, are not uniform all over the transmission channel 1, and dynamically changes. Accordingly, transmission deterioration, which is caused by effects of the polarization dispersion and the polarization dependent loss after propagated the transmission channel, influences the polarization angle of the optical signal entering the transmission channel 1.

However, a distortion of a waveform because of influence of complicated polarization dispersion is cancelled when turning back from a transmission terminal by rotating a polarized wave at 90 degrees and reflecting the polarized wave at a receiver end of the transmission channel 1 as shown in FIG. 4. An optical circulator (optical CIR) 2 and a faraday rotator 3 are shown as a configuration example in that the polarized wave is rotated at 90 degrees. The optical circulator 2 and the faraday rotator 3 are connected to each other by an optical fiber of a fixed polarization. The present invention compensates the polarization dispersion and the polarization dependent loss by canceling distortion of a complicated waveform due to the influence of the polarization distortion and the polarization dependent loss, by utilizing a principle shown in FIG. 4.

Figure 5:
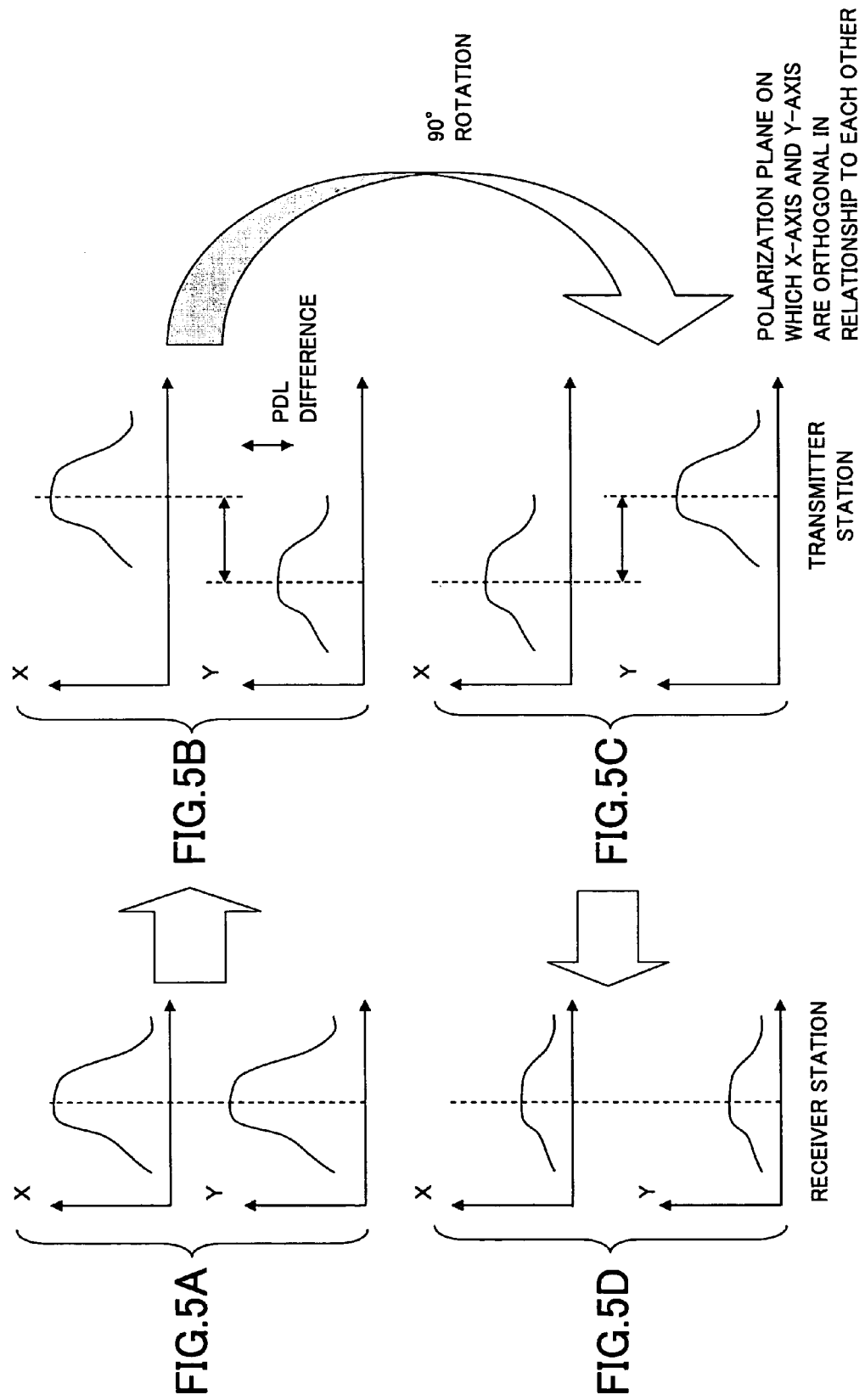
FIG. 5A, FIG. 5B, FIG. 5C, and FIG. 5D are diagrams showing a waveform for explaining the principle of the present invention

FIG. 5A, FIG. 5B, FIG. 5C, and FIG. 5D are diagrams showing a waveform for explaining the principle of the present invention. In FIG. 5A through FIG. 5D, an x-axis and a y-axis show a polarization plane on which the x-axis and the y-axis have an orthogonal relationship. FIG. 5A shows a light transmitted toward a transmitter station from a receiver station. FIG. 5B shows a light received at the transmitter station. The light transmitted toward the transmitter station from the receiver station shown in FIG. 5A causes distortion in the waveform while propagating the transmission channel causing the polarization dispersion and the polarization dependent loss. The polarization plane of the light received at the transmitter station in FIG. 5B is rotated due to the influence of the polarization dispersion and the polarization dependent loss.

At the transmitter station, the polarized wave of the optical signal modulating a light shown in FIG. 5B is rotated at 90 degrees as shown in FIG. 5C. The transmitter station transmits the optical signal toward the receiver station. FIG. 5D shows the optical signal received at the receiver station.

The optical signal transmitted toward the receiver station from the transmitter station in FIG. 5C is propagated through the transmission channel causing the polarization dispersion and the polarization dependent loss. Accordingly, the polarized surface is rotated due to an influence of the polarization dispersion and the polarization dependent loss similar to a transmission from the receiver station to the transmitter station. However, the polarized wave of the light in FIG. 5B, which is influenced by the polarization dispersion and the polarization dependent loss caused when the optical signal is transmitted from the receiver station to the transmitter station in FIG. 5C, is rotated at 90 degrees.

As a result, when the optical signal in FIG. 5C is influenced by the polarization dispersion and the polarization dependent loss caused when the optical signal is transmitted from the transmitter station to the receiver station, the influence of the polarization dispersion and the polarization dependent loss is canceled as the optical signal is shown in FIG. 5D. In the present invention, as the influence of the polarization dispersion and the polarization dependent loss is cancelled when the optical signal is received at the receiver station, the transmitter station conducts a pre-compensation for the polarization dispersion and the polarization dependent loss. In an optical communication system according to the present invention, it is possible to easily and reasonably compensate for the polarization dispersion and the polarization dependent loss for each wavelength at the transmitter station.

In the following, embodiments according to the present invention will be described with reference to drawings. In the embodiments, it is assumed that a compensation of group velocity dispersion is conducted. Also, a WDM communication system shown in the embodiments is one example of an optical communication system utilizing the WDM.

First Embodiment

Figure 6:
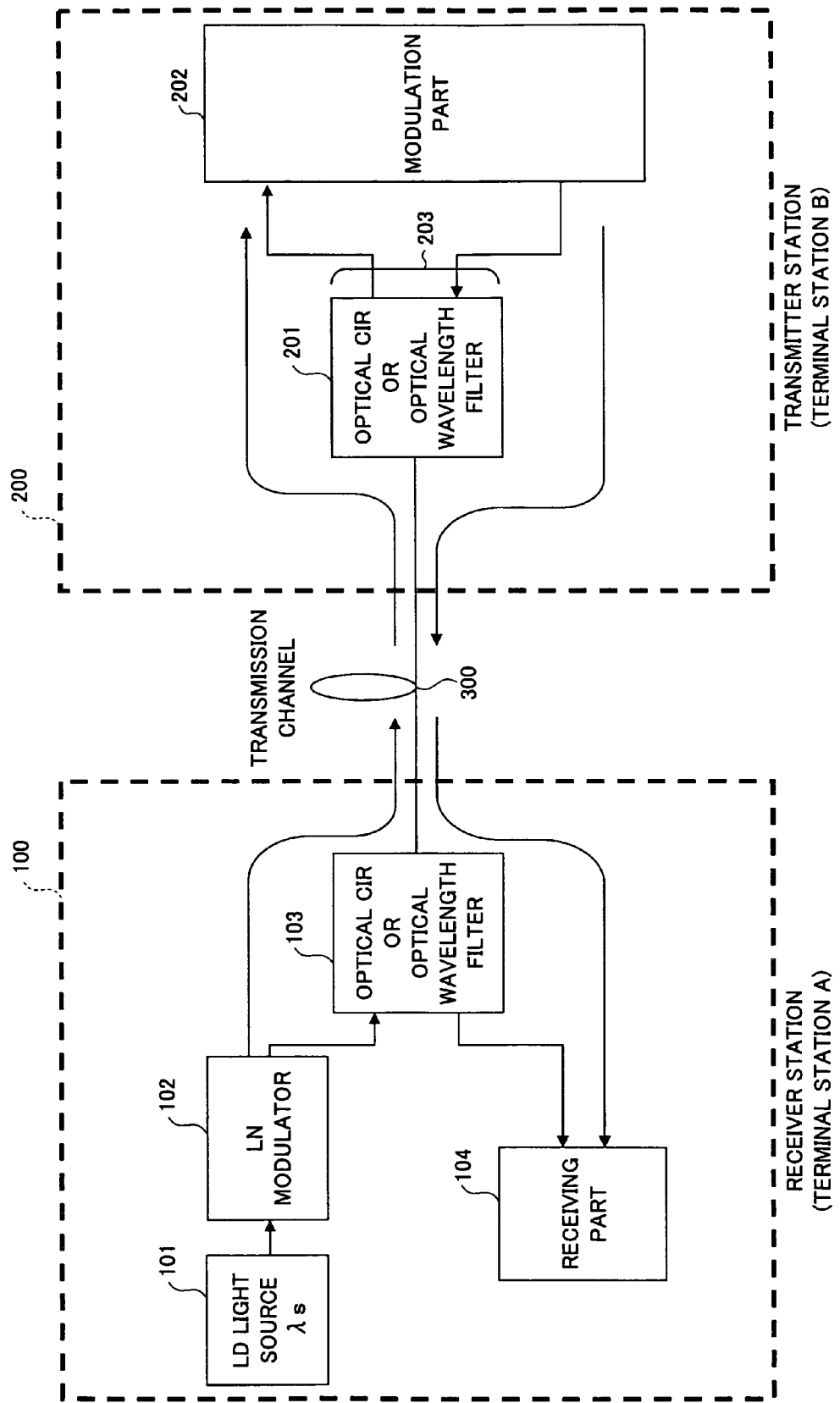
FIG. 6 is a diagram showing a system configuration of an optical communication system according to a first embodiment of the present invention.

FIG. 6 is a diagram showing a system configuration of the optical communication system according to a first embodiment of the present invention. In an optical communication system in FIG. 6, a receiver station (terminal station A) 100 and a transmitter station (terminal station B) 200 are connected to each other through a transmission channel 300. One or more relay stations may be arranged on the transmission channel 300 if necessary.

The receiver station 100 includes an LD light source 101, an LN modulator 102, an optical CIR or optical wavelength filter 103, and a receiving part 104. The transmitter station 200 includes an optical CIR or optical wavelength filter 201, and a modulation part 202. It should be noted that the optical CIR or optical wavelength filter 201 and the modulation part 202 are connected to each other through optical fibers 203 having a fixed polarized wave.

Light output from the LD light source 101 of the receiving part 104 of the receiver station 100 is modulated to a pulse (backward 10 alternating pulse) at the LN modulator 102, and is output to the transmission channel 300 through the optical CIR or optical wavelength filter 103 used to demultiplex received light and transmitted light. The modulation part 202 of the transmitter station 200 receives a pulse (received backward 10 alternating pulse) through the optical CIR or optical wavelength filter 201 used to demultiplex received light and transmitted light, and modulates the pulse to the optical signal. The modulation part 202 outputs the optical signal being modulated to the transmission channel 300 through the optical CIR or optical wavelength filter 201.

The receiving part 104 of the receiver station 100 receives the optical signal through the optical CIR or optical wavelength filter 103. The optical signal received at the receiving part 104 has a waveform in which the influence of the polarization dispersion and the polarization dependent loss of the transmission channel 300 is cancelled, according to the principle of the present invention described above.

However, if the transmitter station 200 cannot detect which one bit of the waveform being distorted by the polarization dispersion and the polarization dependent loss received from the receiver station 100 indicates a pulse, the transmitter station 200 cannot modulate the pulse to a modulation signal (signal to be transmitted)

Figure 7:
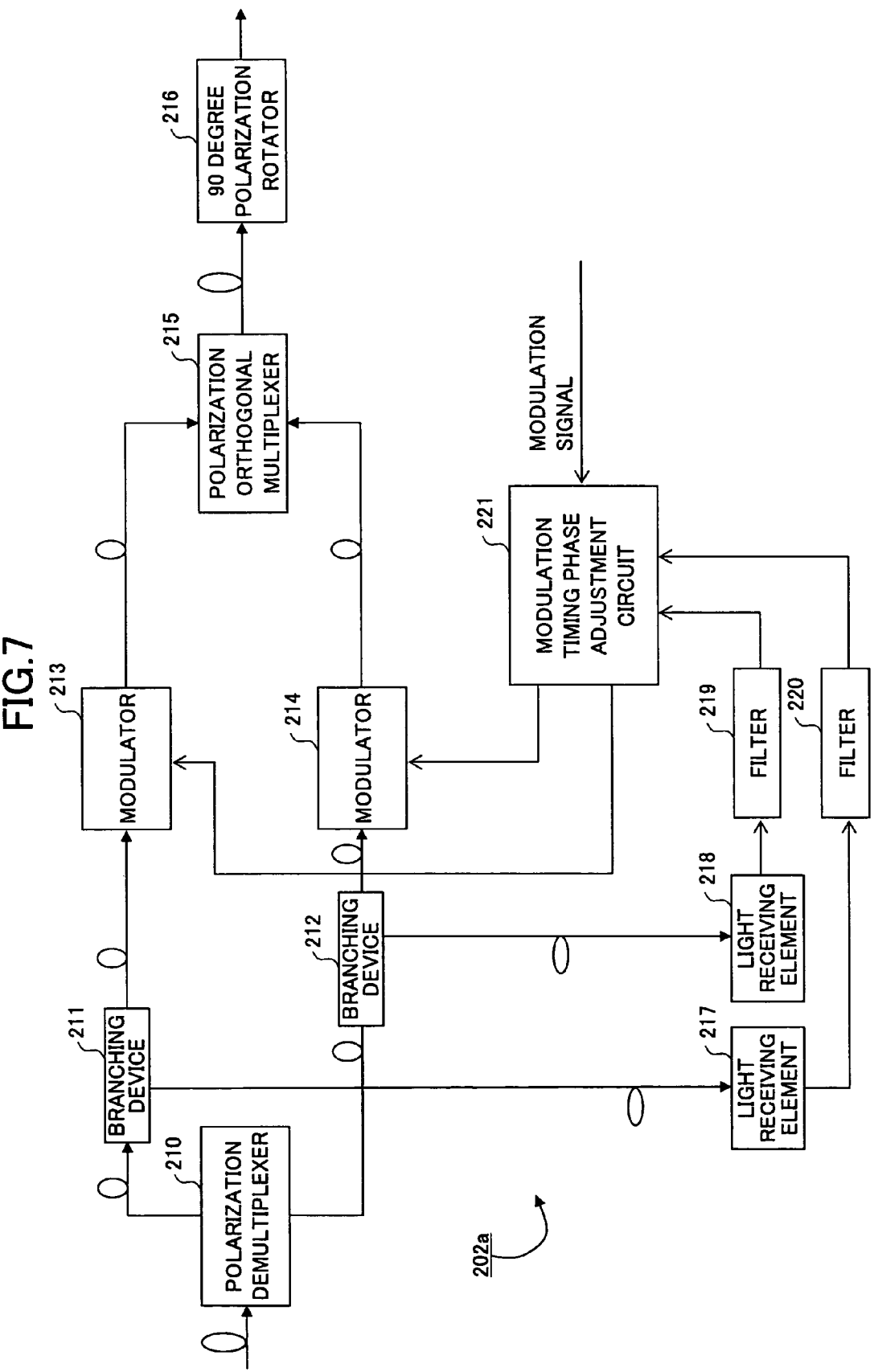
FIG. 7 is a diagram showing a first configuration of a modulation part according to the first embodiment of the present invention.

FIG. 7 is a diagram showing a first configuration of a modulation part according to the first embodiment of the present invention. The modulation part 202a includes a polarization demultiplexer 210, branching devices 211 and 212, modulators 213 and 214, a polarization orthogonal multiplexer 215, a 90 degree polarization rotator 216, light receiving elements 217 and 218, filters 219 and 220, and a modulation timing phase adjustment circuit 221.

The polarization demultiplexer 210 is a device for demultiplexing two polarizations to be separated and the polarization orthogonal multiplexer 215 is a device for crossing and multiplexing two polarizations. Each of the polarization demultiplexer 210 and the polarization orthogonal multiplexer 215 is made up of a Brewster effect element. The branching devices 211 and 212 are devices for branching light, and are made up of an optical coupler (optical CPL) and a like. At the branching devices 211 and 212, a ratio can be selectively set in response to an optical level such as 1:10. Each of the modulators 213 and 214 is made up of a Mach-Zehnder type LINO3 modulator, an electro-absorption modulator or a like. Each of the light receiving elements 217 and 218 is made up of a photo diode and a like.

For example, when the receiver station 100 (FIG. 6) modulates light for each wavelength to a backward 10 alternating pulse, and transmits the light being modulated to the transmitter station 200 (FIG. 6), the polarization demultiplexer 210 receives the received backward 10 alternating pulse from the receiver station 100 and demodulated by the optical CIR or optical wavelength filter 201 (FIG. 6). The polarization demultiplexer 210 demultiplexes the received backward 10 alternating pulse being received, into two polarizations. The polalization demultiplexer 210 transmits the received backward 10 alternating pulse, which is received and demultiplexed, to the modulators 213 and 214 through the respective branching devices 211 and 212. The branching devices 211 and 212 branch the backward 10 alternating pulse, and then transmit the backward 10 alternating pulse to the light receiving elements 217 and 218.

The light receiving elements 217 and 218 convert an electric level of the received backward 10 alternating pulse, and transmit the electric level to the respective filters 219 and 220. Each of the filters 219 and 220 extracts a clock from the electric level received from the light receiving elements 217 and 218, respectively, and then transmits the clock to the modulation timing phase adjustment circuit 221. The modulation timing phase adjustment circuit 221 transmits modulation signals to the modulators 213 and 214 at a timing based on the clocks received from respective filters 219 and 220.

The modulators 213 and 214 modulate the received backward 10 alternating pulse, which is received from the polarization demultiplexer 210 through the respective branching devices 211 and 212, with the modulation signal received from the modulation timing phase adjustment circuit 221, and transmit the received backward 10 alternating pulse to the polarization orthogonal multiplexer 215 as the optical signal. The polarization orthogonal multiplexer 215 crosses and multiplexes received optical signals to be a multiplexed optical signal., and transmits the multiplexed optical signal to the 90 degree polarization rotator 216. The 90 degree polarization rotator 216 rotates a polarized wave of the multiplexed optical signal at 90 degrees. The multiplexed optical signal which polarized wave is rotated at the 90 degrees is output as an optical signal to the transmission channel 300 via the optical CIR or the wavelength filter 201.

The optical transmitting system included in the receiver station 100 is made up of a polarization fixing optical circuit. In the optical transmitting system, there is no rotation of the polarized wave. The optical transmitting system is designed to maintain the polarization state, which is received. The backward 10 alternating pulse transmitted from the receiver station 100 maintains the polarization state to be stable by additionally providing a configuration portion 110a between the LN modulator 102 and the optical CIR or optical wavelength filter 103 as shown in FIG. 8, FIG. 9, or FIG. 10.

Figure 8:
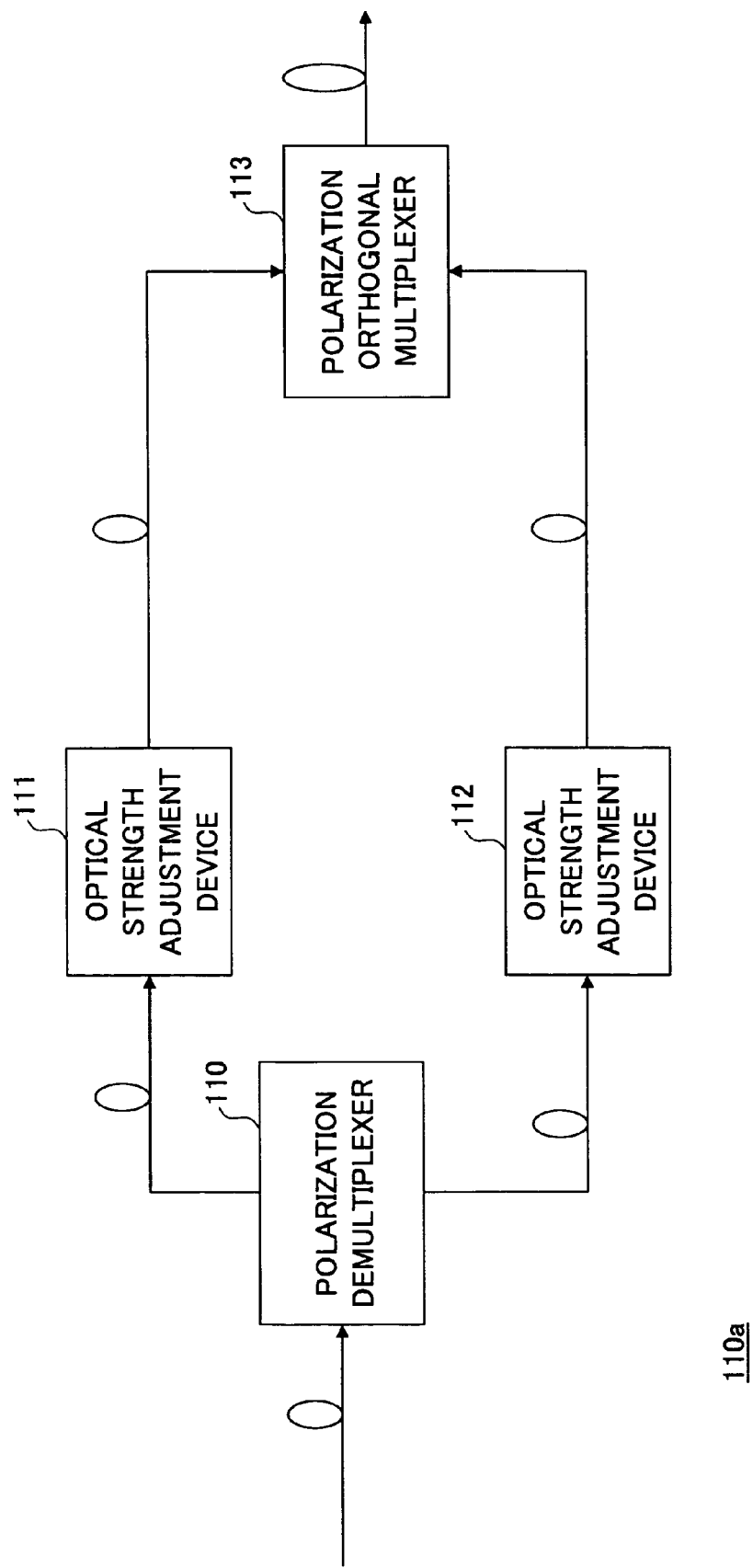
FIG. 8 is a diagram showing a first configuration portion included in the receiving part according to the first embodiment of the present invention.

FIG. 8 is a diagram showing a first configuration portion included in the receiving part according to the first embodiment of the present invention. A first configuration portion 110a in FIG. 8 includes a polarization demultiplexer 110, optical strength adjustment devices 111 and 112, and a polarization orthogonal multiplexer 113. Each of the optical strength adjustment devices 111 and 112 is a device for adjusting the optical level, and for example, is made up of an electro-absorption optical attenuator or a like, which does not have a polarization dependence.

The polarization demultiplexer 110 demultiplexes the backward 10 alternating pulse into two polarizations. The polarization demultiplexer 110 transmits the backward 10 alternating pulse, which is demultiplexed into two polarizations, to the optical strength adjustment devices 111 and 112. The optical strength adjustment devices 111 and 112 adjust the optical level of the backward 10 alternating pulse, and transmit the backward 10 alternating pulse to the polarization orthogonal multiplexer 113. After the polarization orthogonal multiplexer 113 crosses and multiplexes the backward 10 alternating pulse being received, the polarization multiplexer 113 outputs the backward 10 alternating pulse to the transmission channel 300.

Figure 9:
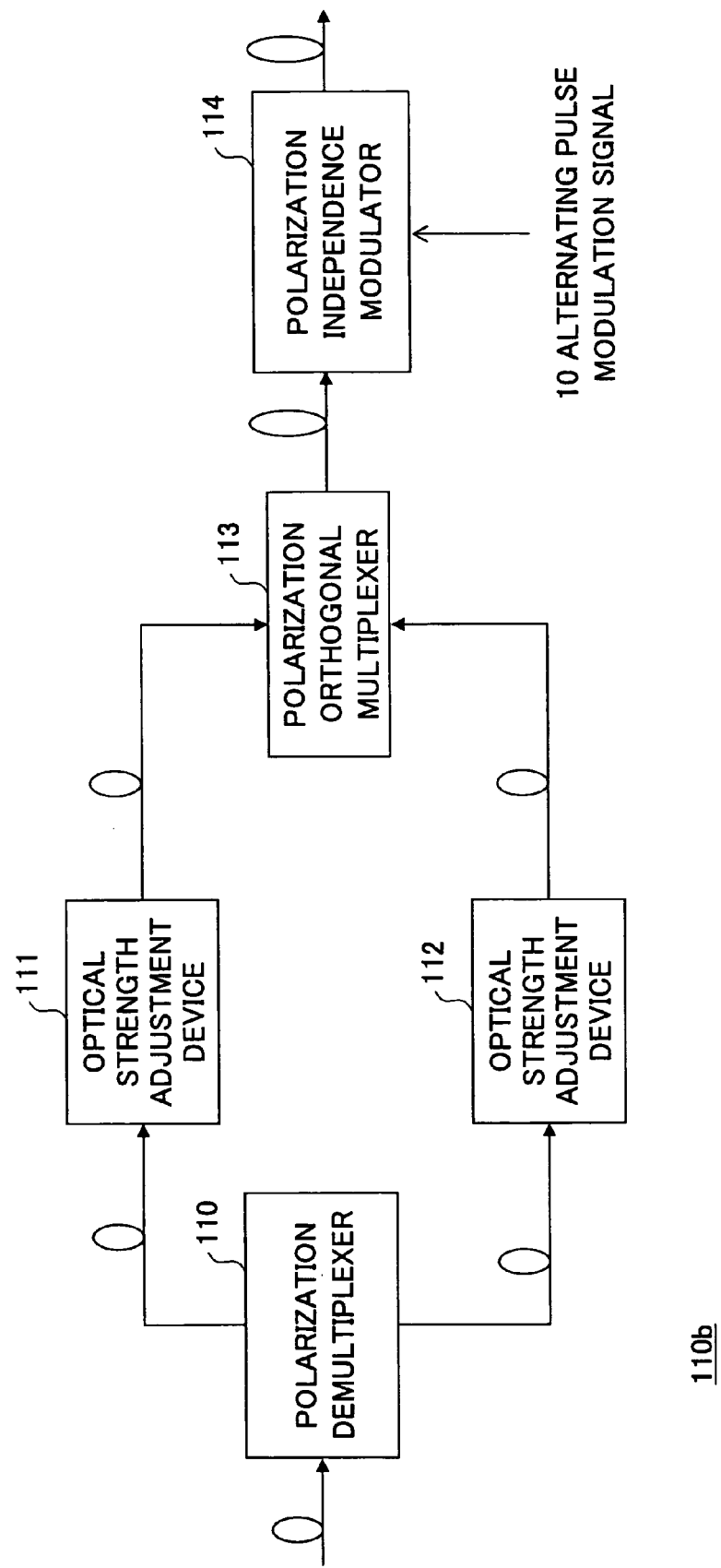
FIG. 9 is a diagram showing a second configuration portion included in the receiving part according to the first embodiment of the present invention.
Figure 10:
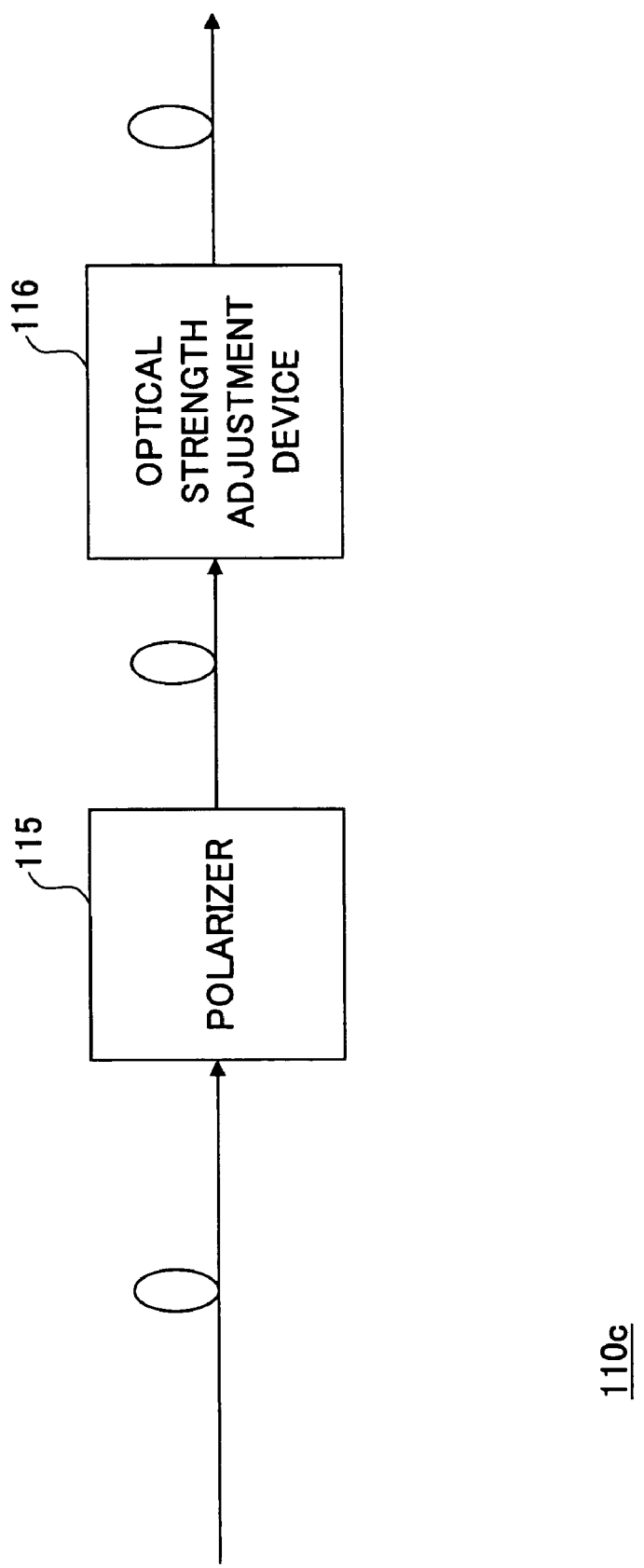
FIG. 10 is a diagram showing a third configuration portion included in the receiving part according to the first embodiment of the present invention.

FIG. 9 is a diagram showing a second configuration portion included in the receiver station according to the first embodiment of the present invention. A second configuration portion 110b in FIG. 9 has a similar configuration to the first configuration portion 110a in FIG. 8 other than one part of the second configuration portion 110b, and the explanation thereof will be appropriately omitted. The second configuration portion 110b in FIG. 9 includes the polarization demultiplexer 110, the optical strength adjustment devices 111 and 112, the polarization orthogonal multiplexer 113, and a polarization independence modulator 114.

For example, the polarization demultiplexer 110 receives light output from the LD light source 101, and demultiplexes the light into two polarizations. The polarization demultiplexer 110 transmits the light being demultiplexed to the optical strength adjustment devices 111 and 112. The optical strength adjustment devices 111 and 112 adjust the optical level of the light being received, and transmit the light to the polarization orthogonal multiplexer 113. After the polarization orthogonal multiplexer 113 crosses and multiplexes receive light, the polarization orthogonal multiplexer 113 outputs the received light to the transmission channel 300 (FIG. 6).

FIG. 10 is a diagram showing a third configuration portion included in the receiver station according to the first embodiment of the present invention. A third configuration portion 110c in FIG. 10 has a configuration utilizing a polarization plane having a single direction. The third configuration portion 110c in FIG. 10 includes a polarizer 115, an optical strength adjustment device 116, and a like.

After the polarizer 115 changes the backward 10 alternating pulse being received into a single polarization, the polarizer 115 outputs the single polarization to the optical strength adjustment device 116. After the optical strength adjustment device 116 adjusts the optical level of the backward 10 alternating pulse, the optical strength adjustment device 116 outputs the backward 10 alternating pulse to the transmission channel 300 (FIG. 6). For example, in a case in that a device having higher polarization dependent loss is arranged on any of optical paths toward the light receiving elements of the receiving part 104, by the third configuration part 110c, it is possible to obtain a higher effect.

By additionally providing the configuration portion 110a, 110b, or 100c of the receiver station 100 as shown in FIG. 8, FIG. 9, or FIG. 10, the transmitter station 200 may correspond to the polarization dispersion and the polarization dependent loss caused by the transmission channel 300. Moreover, the modulation part 202 of the transmitter station 200 may have a configuration as shown in FIG. 11 or FIG. 12.

Figure 11:
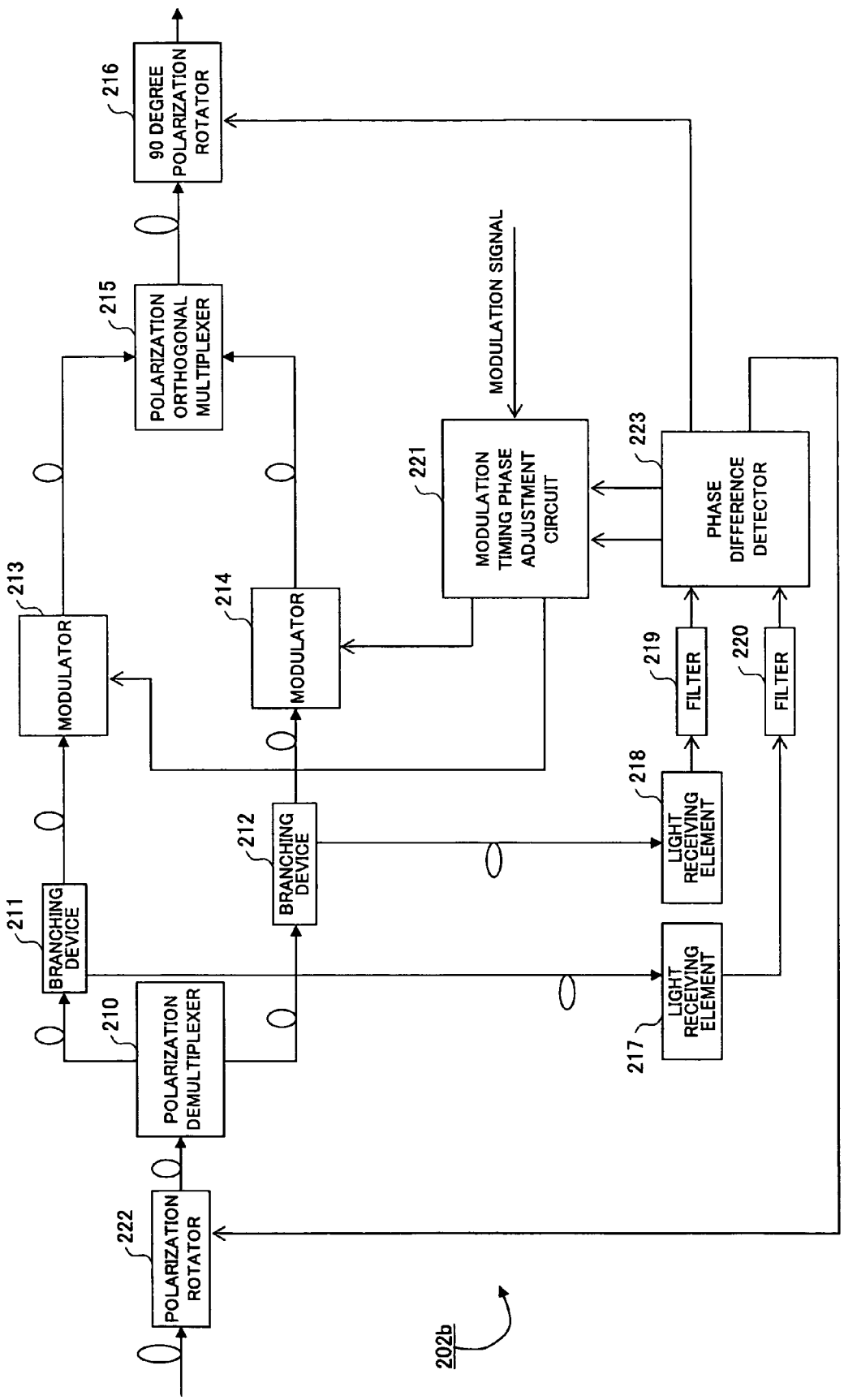
FIG. 11 is a diagram showing a second configuration of the modulation part according to the first embodiment of the present invention.
Figure 12:
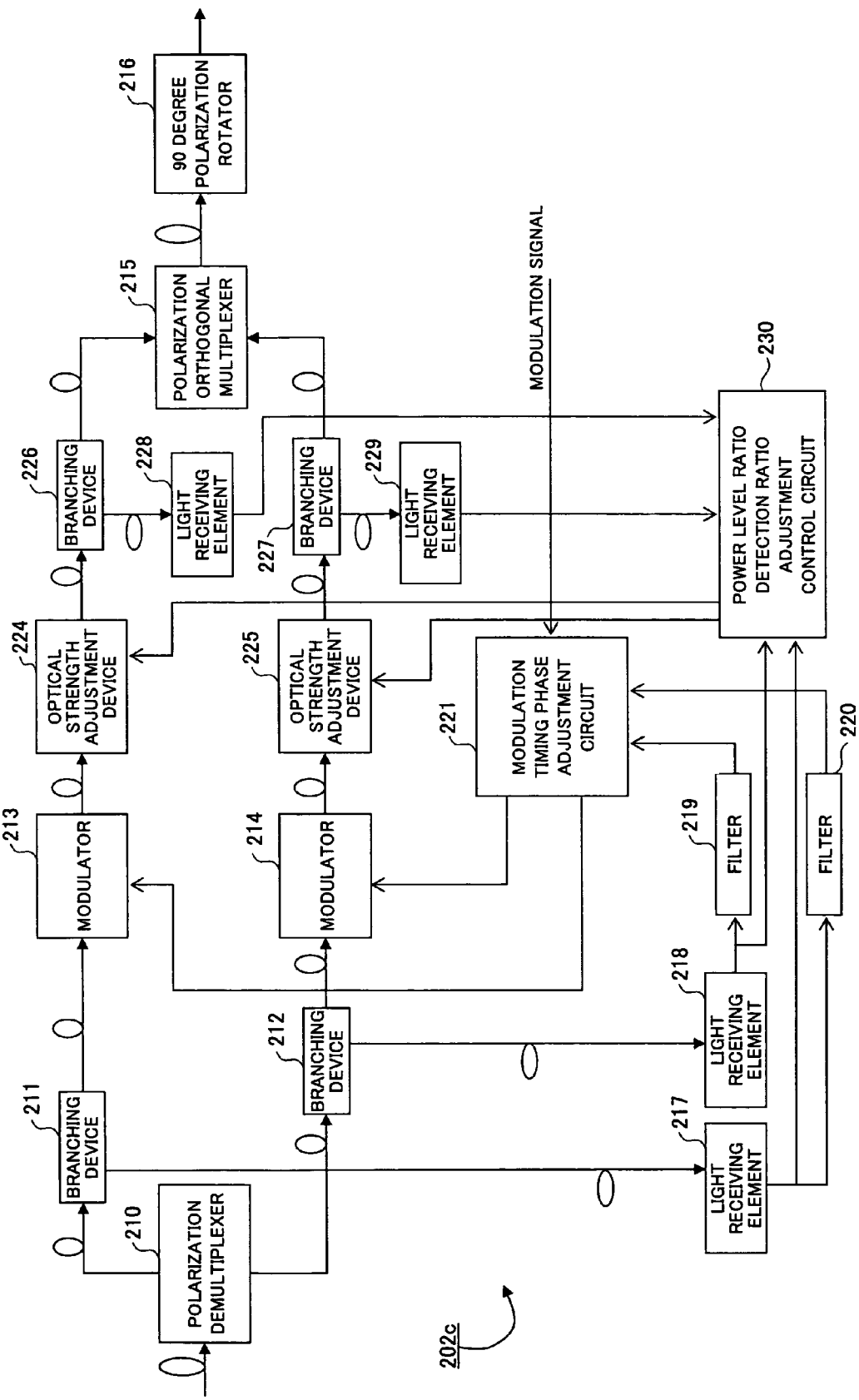
FIG. 12 is a diagram showing a third configuration of the modulation part according to the first embodiment of the present invention

FIG. 11 is a diagram showing a second configuration of a modulation part according to the first embodiment of the present invention. In FIG. 11, the modulation part 202b has a similar configuration to the modulation part 202a in FIG. 7 other than two parts of the modulation part 202b, and explanation thereof will be appropriately omitted. The modulation part 202b in FIG. 11 includes the polarization demultiplexer 210, the branching devices 211 and 212, the modulators 213 and 214, the polarization orthogonal multiplexer 215, the 90 degree polarization rotator 216, the light receiving elements 217 and 218, the filters 219 and 220, the modulation timing phase adjustment circuit 221, and a polarization rotator 222, and a phase difference detector 223.

The polarization rotator 222 is a device for rotating the polarization plane of light. For example, by applying a magnetic field to a garnet crystal or a like, the polarization plane is rotated due to the Faraday effect. For example, when the receiver station 100 modulates light for each wavelength into the backward 10 alternating pulse, and transmits the backward 10 alternating pulse to the transmitter station 200, the polarization rotator 222 receives the received backward 10 alternating pulse, which is sent from the receiver station 100 and demultiplexed by the optical CIR or optical wavelength filter 201.

The polarization rotator 222 rotates the polarization plane of the received backward 10 alternating pulse so that a delay difference of the received backward 10 alternating pulse, which is to be demultiplexed by the polarization demultiplexer 210, becomes maximum. The phase difference detector 223 controls the rotation of the polarization plane of the received backward 10 alternating pulse conducted by the polarization rotator 222. The polarization demultiplexer 210 receives the received backward 10 alternating pulse, in which the polarization plane is rotated. The polarization demultiplexer 210 transmits the received backward 10 alternating pulse being demultiplexed into two polarizations, to the modulators 213 and 214 through the respective branching devices 211 and 212. The branching devices 211 and 212 branch the received backward 10 alternating pulse received from the polarization demultiplexer 210, and then transmit the received backward 10 alternating pulse to the light receiving elements 217 and 218.

The light receiving elements 217 and 218 convert the optical level of the received backward 10 alternating pulse received from the respective branching devices 211 and 212, into the electric level, and then transmit the electric level to the respective filters 219 and 220. Each of the filters 219 and 220 extracts a clock from the electric level, and transmits the clock to the phase difference detector 223. The phase difference detector 223 transmits the clocks received from the filters 219 and 220 to the modulation timing phase adjustment circuit 221.

Moreover, the phase difference detector 223 detects a phase difference of the received backward 10 alternating pulse, which is demultiplexed by the polarization demultiplexer 210, in response to the clocks from the filters 219 and 220. The phase difference detector 223 controls the polarization rotator 222 so that the delay difference of the received backward 10 alternating pulse, which is demultiplexed by the polarization demultiplexer 210, becomes maximum. Furthermore, the modulation timing phase adjustment circuit 221 transmits the modulation signals to the modulators 213 and 214 at a timing based on the clocks received from the respective filters 219 and 220.

Each of the modulators 213 and 214 modulates the received backward 10 alternating pulse, which is received from the polarization demultiplexer 210 through the respective branching devices 211 and 212, with the modulation signal received form the modulation timing phase adjustment circuit 221, and transmits the received backward 10 alternating pulse being modulated, to the polarization orthogonal multiplexer 215. The polarization orthogonal multiplexer 215 crosses and multiplexes received optical signals to be a multiplexed optical signal, and transmits the multiplexed optical signal to the 90 degree polarization rotator 216. The 90 degree polarization rotator 216 relatively rotates a polarized wave of the multiplexed optical signal at 90 degrees with respective to the rotation of the polarization plane conducted by the polarization rotator 222. The polarized wave, which is rotated at 90 degrees by the 90 degree polarization rotator 216, outputs the transmission channel 300 through the optical CIR or the wavelength filter 201.

In the modulation part 202b in FIG. 11, the polarization rotator 222 rotates the polarization plane of the received backward 10 alternating pulse so that the delay difference of the received backward 10 alternating pulse, which is demultiplexed by the polarization demultiplexer 210 becomes maximum. Accordingly to this configuration of the modulation part 202b, it is possible to clearly separate a waveform which expansion becomes maximum because of the polarization dispersion. Thus, a performance can be improved. In the modulation part 202b in FIG. 11, after the polarized wave is rotated by the polarization rotator 222, the polarization plane is needed to be relatively rotated by the 90 degree polarization rotator 216.

FIG. 12 is a diagram showing a third configuration of a modulation part according to the first embodiment of the present invention. In FIG. 12, the modulation part 202c has a similar configuration to the modulation part 202a in FIG. 7 or the modulation part 202b in FIG. 11, other than some parts of the modulation part 202c, and explanation thereof will be appropriately omitted. The modulation part 202c in FIG. 12 includes the polarization demultiplexer 210, the branching devices 211 and 212, the modulators 213 and 214, the polarization orthogonal multiplexer 215, the 90 degree polarization rotator 216, the light receiving elements 217 and 218, the filters 219 and 220, the modulation timing phase adjustment circuit 221, and optical strength adjustment devices 224 and 225, and branching devices 226 and 227, light receiving elements 228 and 229, and a power level ratio detection ratio adjustment control circuit 230.

The polarization demultiplexer 210 demultiplexes the received backward 10 alternating pulse being received into two polarizations, and transmits the received backward 10 alternating pulse to the modulators 213 and 214 through the branching devices 211 and 212. The branching devices 211 and 212 branch and transmit the received backward 10 alternating pulse to the light receiving elements 217 and 218.

The light receiving elements 217 and 218 convert the optical level of the received backward 10 alternating pulse into the electric level, and transmit the electric level to the respective filters 219 and 220. Each of the filters 219 and 220 extracts a clock from the electric level received from the respective light receiving elements 217 and 218, and transmits the clock to the modulation timing phase adjustment circuit 221.

Moreover, each of the light receiving elements 217 and 218 transmits the electric level, which is converted from the optical level of the received backward 10 alternating pulse, to the power level ratio detection ratio adjustment control circuit 230. The modulation timing phase adjustment circuit 221 transmits a modulation signal to the modulators 213 and 214 at a timing based on the clocks received from the light receiving elements 217 and 218.

The modulators 213 and 214 modulate the received backward 10 alternating pulse received from the respective branching devices 211 and 212 with the modulation signal, and transmits the received backward 10 alternating pulse as an optical signal to the respective optical strength adjustment devices 224 and 225. After the optical strength adjustment devices 224 and 225 adjust a level of the optical signal received from the respective modulators 213 and 214, the optical strength adjustment devices 224 and 225 transmit the level of the optical signal to the polarization orthogonal multiplexer 215 through the respective branching devices 226 and 227. It should be noted that each adjustment of the level of the optical signal, which is conducted by each of the optical strength adjustment devices 224 and 225, is controlled by the power level ratio detection ratio adjustment control circuit 230.

The branching devices 226 and 227 branch the optical signals received from the relative optical strength adjustment devices 224 and 225, to the respective light receiving elements 228 and 229. The light receiving elements 228 and 229 convert the level of the optical signal into the electric level, and transmit the electric level to the power level ratio detection ratio adjustment circuit 230.

The power level ratio detection ratio adjustment control circuit 230 controls the adjustment of the level of the optical signal, which is conducted by each of the optical strength adjustment devices 224 and 225, in response to the electric level received from each of the light receiving elements 228 and 229.

The polarization orthogonal multiplexer 215 crosses and multiplexes the optical signals received from the branching devices 226 and 227 to be a multiplexed optical signal, and transmits the multiplexed optical signal to the 90 degree polarization. The 90 degree polarization rotator 216 rotates the polarized wave of the multiplexed optical signal at 90 degrees. The multiplexed optical signal, which polarized wave is rotated at 90 degree by the 90 degree polarization rotator 216, is output as an optical signal to the transmission channel 300 through the optical CIR or the wavelength filter 201. In the modulation part 202 in FIG. 12, since the level of the optical signal can be adjusted, the polarization dependent loss can be compensated. In general, the polarization dependent loss may be controlled so that the optical level is constant at a side of the receiver station. However, it is required to control the polarization dependent loss for each wavelength. In the WDM communication system, for example, even if an optical amplifier controls so that an output of a total power level is constant, there is no effect.

As described above, the modulation part 202 of the transmitter station 200 converts an optical waveform of the received backward 10 alternating pulse into an electric signal, and transmits the electric signal to the filters 219 and 220. Each of the filters 219 and 220 extracts a clock from the electric signal received from the modulation part 202, and transmits the clock to the modulation timing phase adjustment circuit 221.

After the modulation timing phase adjustment circuit 221 adjusts a phase of the modulation signal at a timing based on the clocks received from the filters 219 and 220, the modulation timing phase adjustment circuit 221 transmits the modulation signal to the modulators 213 and 214. The modulators 213 and 214 modulate the received backward 10 alternating pulse received from the respective branching devices 211 and 212 by synchronizing the clocks extracted from the received backward 10 alternating pulse.

If the modulations are conducted without synchronizing the clocks extracted from the received backward 10 alternating pulse, a pulse width is decreased at the receiver station 100. By configuring the receiving part 104 of the receiver station 100 as shown in FIG. 13, it is possible to monitor the pulse width and transmit information for adjusting the phase to the modulation part 202.

FIG. 13 is a diagram showing a first configuration of a receiving part included in the receiver station according to the first embodiment of the present invention. The receiving part 104-1 in FIG. 13 includes a light receiving element 121, a demodulation circuit 122, a pulse width detection circuit 123, a clock timing extraction part 124, and a monitor control signal transmission part 125.

The light receiving element 121 receives the optical signal from the transmitter station 200 through the optical CIR or optical wavelength filter 103. The light receiving element 121 converts the optical level of the optical signal into the electric level, and transmits the electric level to the pulse width detection circuit 123 and the clock timing extraction part 124.

The clock timing extraction part 124 extracts a clock from the electric level received from the light receiving element 121. The demodulation circuit 122 demodulates the electric level received from the light receiving element 121, and outputs the electric level being demodulated, as a demodulation signal (received data). The pulse width detection circuit 123 detects a pulse width based on the electric level received from the light receiving element 121 and the demodulation signal received form the demodulation circuit 122. The pulse width detection circuit 123 informs the pulse width, which is detected, to the monitor control signal transmission part 125.

The monitor control signal transmission part 125 transmits the information for adjusting the phase to the modulation part 202 of the transmitter station 200 based on the pulse width informed the pulse width detection circuit 123. For example, the information for adjusting the phase is included in an SV signal, which is multiplexed with a wavelength difference from a wavelength of a main signal, or included in overhead (OH) information of the main signal, and transmits the information for adjusting the phase to the modulation part 202 of the transmitter station 200.

However, the modulation part 202 of the transmitter station 200 can modulate each wavelength by synchronizing the clocks extracted form the received backward 10 alternating pulse. As a result, the modulation part 202 of the transmitter station 200 can adjust the phase so that the pulse width becomes maximum (duty ratio 50% in a case of an RZ (Return to Zero) code) at the receiving part 104-1 of the receiver station 100.

FIG. 14 is a diagram showing a first variation of the system configuration of the optical communication system including a counter terminal station according to the first embodiment of the present invention. In the optical communication system in FIG. 14, a terminal station 100a and a terminal station 200a are connected to each other through transmission channels 300a and 300b. It should be noted that if necessary, one or more relay stations may be arranged on the transmission channels 300a and 300b.

Each of the terminal stations 100a and 200a includes an optical transmitting system for transmitting an optical signal, and an optical receiving system for receiving the optical signal. The terminal station 100a includes the optical receiving system, which includes an optical CIR or optical wavelength filter 103a, a transmitting part 130a, and a frame/OH process part 131a, and the optical transmitting system, which includes an optical CIR or optical wavelength filter 201b, a modulation part 202b, and a frame/OH process part 240b.

The terminal station 200a includes the optical receiving system, which includes a receiving part 104b, an optical CIR or optical wavelength filter 103b, a transmitting part 130b, and a frame/OH process part 131b, and the optical transmitting system, which includes an optical CIR or optical wavelength filter 201a, a modulation part 202a, and a frame/OH process part 240a.

The transmitting parts 130a and 130b are configured as described above with reference to FIG. 8 through FIG. 10. The receiving parts 104a and 104b are configured as described above with reference to FIG. 13. Moreover, the modulation parts 202a and 202b are configured as described above with reference to FIG. 7, FIG. 11, and FIG. 12. It should be noted that a third configuration of the optical communication system in FIG. 14 is similar to the configuration described above, and explanation thereof will be appropriately omitted.

In the optical communication system in FIG. 14, the information for adjusting the phase is transmitted from the optical receiving system to the optical transmitting system as described below. The receiving part 104a transmits the information for adjusting the phase to the frame/OH process part 240b. The frame/OH process part 240 includes the information for adjusting the phase into the overhead information.

After the information for adjusting the phase is transmitted to the terminal station 200a, the information for adjusting the phase included in the overhead information is retrieved form the overhead information by the frame/OH process part 131b, and transmitted to the modulation timing phase adjustment circuit 221a of the modulation part 202a. Accordingly, the modulation part 202a adjusts the phase so that the pulse width becomes maximum at the receiving part 104a of the terminal station 100a, by using the information for adjusting the phase, which is received from the frame/OH process part 131b.

The receiving part 104b transmits the information for adjusting the phase to the frame/OH process part 240a. The frame/OH process part 240a includes the information for adjusting the phase, which is received from the receiving part 104b, into the overhead information.

After the information for adjusting the phase included in the overhead information is transmitted to the terminal station 100a, the information for adjusting the phase is retrieved from the overhead information at the frame/OH process part 131a, and is transmitted to the modulation timing phase adjustment circuit 221b of the modulation part 202b. Accordingly, the modulation part 202b can adjust the phase so that the pulse width becomes maximum at the receiving part 104b of the terminal station 200a, by using the information for adjusting the phase, which is received from the frame/OH process part 131a.

Moreover, FIG. 15 is a diagram showing a second variation of the configuration of the optical communication system including the opposite terminal station, according to the first embodiment of the present invention. The second variation of the configuration of the optical communication system is similar to the configuration in FIG. 14 other than some parts of the configuration in FIG. 14, and explanation thereof will be approximately omitted. It should be noted that the frame/OH process parts are omitted and are not shown in the configuration of the optical communication system in FIG. 15.

Different from the terminal station 100a in FIG. 14, the terminal station 100b in FIG. 15 includes wavelength filters 132a and 241b, and a monitor wavelength CH transmitter/receiver 133. The wavelength filter 132a is arranged between the optical CIR or optical wavelength filter 103a and the receiving part 104a. The wavelength filter 241b is arranged between the optical CIR or optical wavelength filter 201b and the modulation part 202b. In addition, the monitor wavelength CH transmitter/receiver 133 is arranged between the wavelength filter 132a and receiving part 104a, and the wavelength filter 241b and modulation part 202b.

Different from the terminal station 200a in FIG. 14, the terminal station 200b includes the wavelength filters 132b and 241a, and the monitor wavelength CH transmitter/receiver 134. The wavelength filter 132b is arranged between the optical CIR or optical wavelength filter 103b and the receiving part 104a. The wavelength filter 241a is arranged between the optical CIR or optical wavelength filter 201a and the modulation part 202a. In addition, the monitor wavelength CH transmitter/receiver 134 is arranged between the wavelength filter 132b and receiving part 104b, and the wavelength filter 241a and modulation part 202a.

In the optical communication system in FIG. 15, the information for adjusting the phase is transmitted from the optical receiving system to the optical transmitting system as described below. The receiving part 104a transmits the information for adjusting the phase to the monitor wavelength CH transmitter/receiver 133. The monitor wavelength CH transmitter/receiver 133 multiplexes the information for adjusting the phase into an optical signal by the wavelength filter 241b.

After the information for adjusting the phase, which is multiplexed into the optical signal, is transmitted to the terminal station 200b, the information is retrieved form the optical signal by the wavelength filter 132b, and is transmitted to the modulation timing phase adjustment circuit 221a of the modulation part 202a through the modulation wavelength CH transmitter/receiver 134. Accordingly, the modulation part 202a can adjust the phase so that the pulse width becomes maximum at the receiving part 104a of the terminal station 10b, by using the information for adjusting the phase.

The receiving part 104b transmits the information for adjusting the phase to the monitor wavelength CH transmitter/receiver 134. The monitor wavelength CH transmitter/ receiver 134 multiplexes the information for adjusting the phase into an optical signal by the wavelength filter 241a.

After the information for adjusting the phase, which is multiplexed into the optical signal, is transmitted to the terminal station 100b, the information is retrieved by the wavelength filter 132a, and is transmitted to the modulation timing phase adjustment circuit 221b of the modulation part 202b through the monitor wavelength CH transmitter/receiver 133. Accordingly, the modulation part 202b can adjust the phase so that the pulse width becomes maximum by the receiving part 104b of the terminal station 200b, by using the information for adjusting the phase.

Figure 16A:
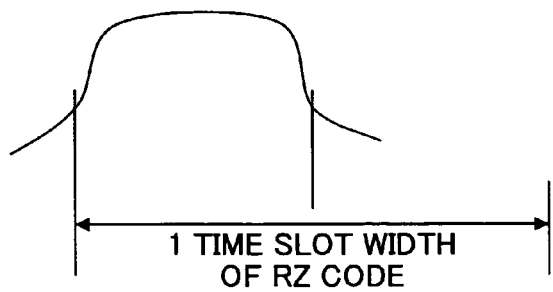
FIG. 16A is a diagram showing one time slot width of an RZ code according to the first embodiment of the present invention.
Figure 16B:
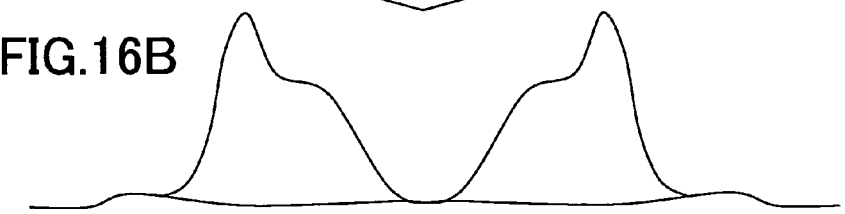
FIG. 16B is a diagram showing an appearance of the wave deterioration in the polarization dispersion according to the first embodiment of the present invention.
Figure 16C:
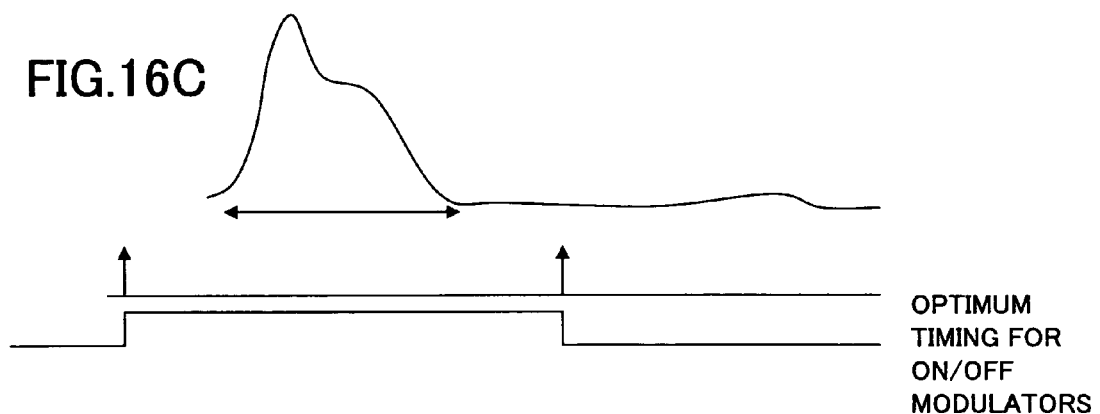
FIG. 16C is diagram showing an optimum timing for ON/OFF of the modulators and a divided waveform, according to the first embodiment of the present invention.
Figure 16D:
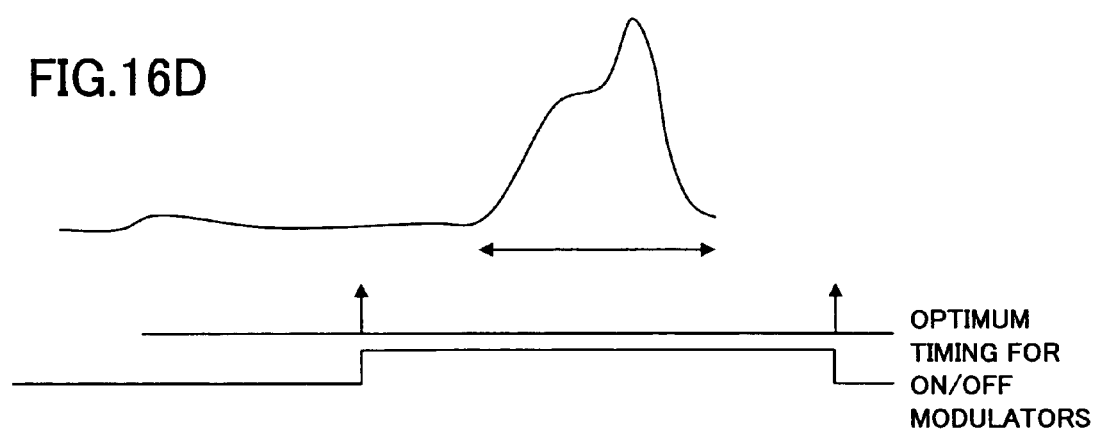
FIG. 16D is diagram showing the optimum timing for ON/OFF of the modulators and the divided waveform, according to the first embodiment of the present invention.

Phases, in which the pulse width becomes maximum at the receiving part, will be shown in FIG. 16A through FIG. 16D. FIG. 16A is a diagram showing one time slot width of the RZ code according to the first embodiment of the present invention. FIG. 16B is a diagram showing an appearance of the wave deterioration in the polarization dispersion according to the first embodiment of the present invention. FIG. 16C and FIG. 16D are diagrams showing an optimum timing for ON/OFF of the modulators and a divided waveform, according to the first embodiment of the present invention. For example, in the optical communication system according to the present invention, by controlling ON/OFF of the modulators 213 and 214 shown in FIG. 16C and FIG. 16D, it is possible to clearly separate waveforms shown in FIG. 16B.

Figure 17:
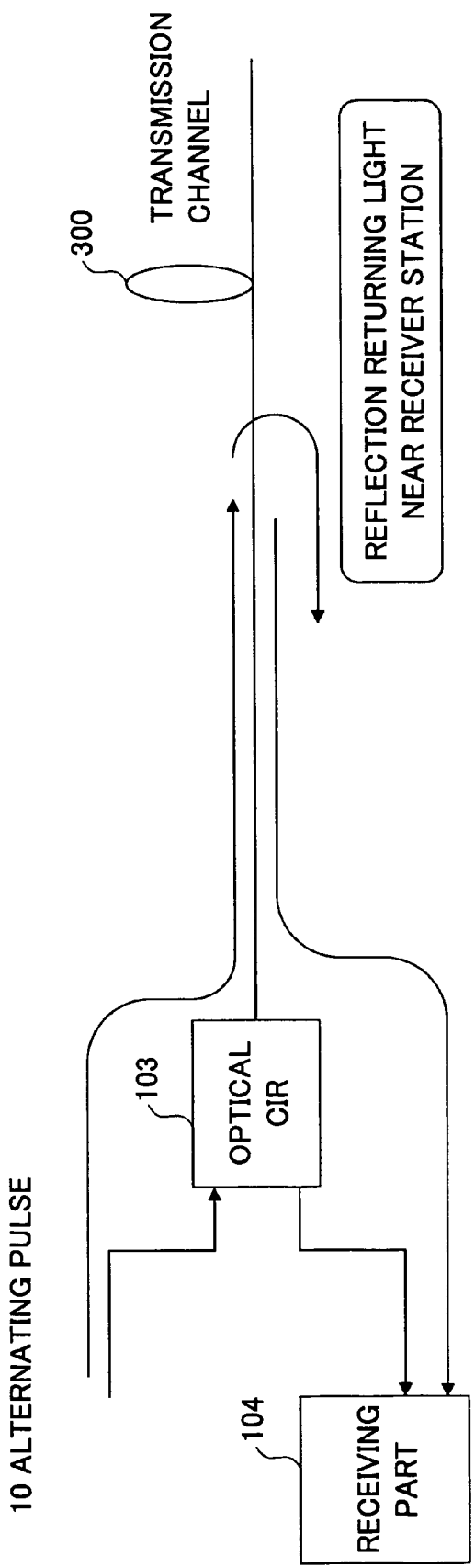
FIG. 17 is a diagram for explaining a marginal factor in a case of a communication using the same wavelength.

In the system configuration in FIG. 6, light in a transmitting direction and light in the receiving direction in the receiver station 100 have the same waveform. Thus, as shown in FIG. 17, light elements in the transmitting direction and in the receiving direction cannot be sufficiently separated at the optical CIR or optical wavelength filter 103. Disadvantageously, the transmission distance becomes longer, or a communication cannot be conducted due to a reflection of the transmission channel 300.

FIG. 17 is a diagram for explaining a marginal factor in a case of a communication using the same wavelength. When a reflection occurs at the transmission channel 300 near the receiver station 100, receiving light and reflection returning light are superimposed to each other. It should be noted that the longer the transmission distance, the smaller the receive level of the optical signal received at the receiving part 104. As a result, the receiving part 104 cannot identify data.

Figure 18:
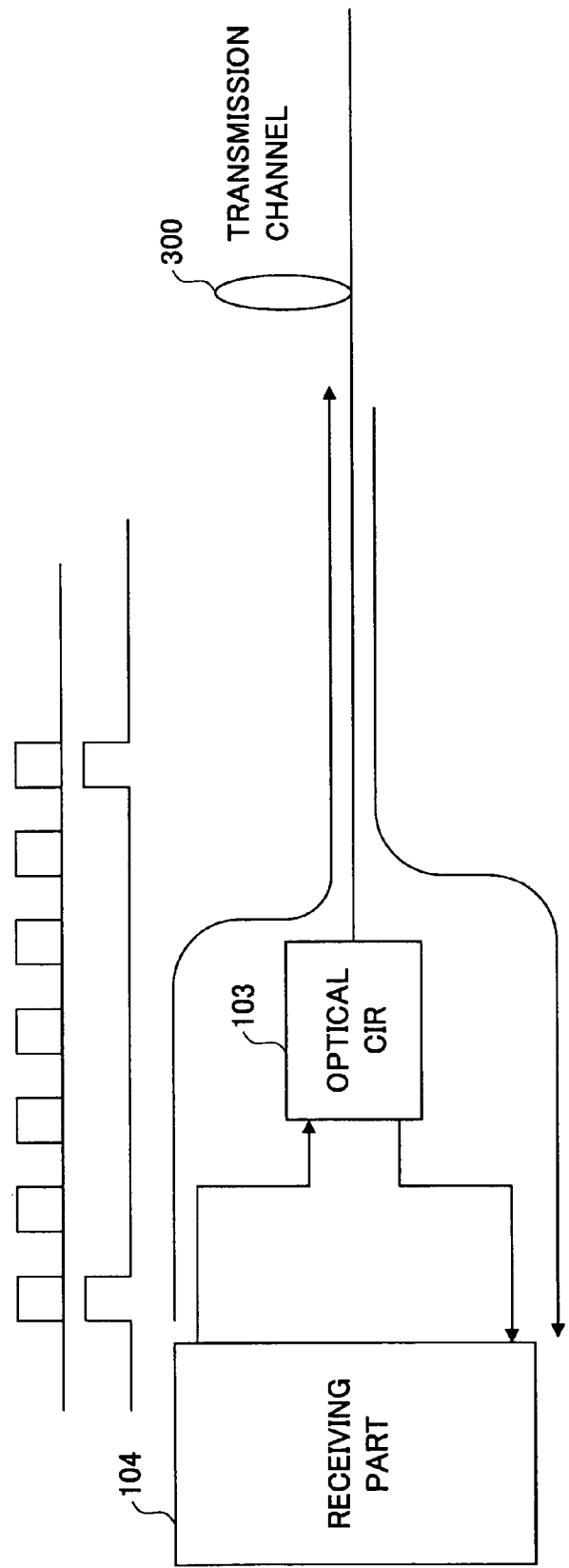
FIG. 18 is a diagram for explaining a transmission example in that a transmission interval of the backward 10 alternating pulse is set to be longer, according to the first embodiment of the present invention.

Therefore, by transmitting the backward 10 alternating pulse from the receiver station 100 at a transmission interval which is possible to follow a fluctuation of the polarization dispersion and the polarization dependent loss as shown in FIG. 18, it is possible to eliminate an influence of the reflection returning light. FIG. 18 is a diagram for explaining a transmission example in that the transmission interval of the backward 10 alternating pulse is set to be longer, according to the first embodiment of the present invention.

Figure 19:
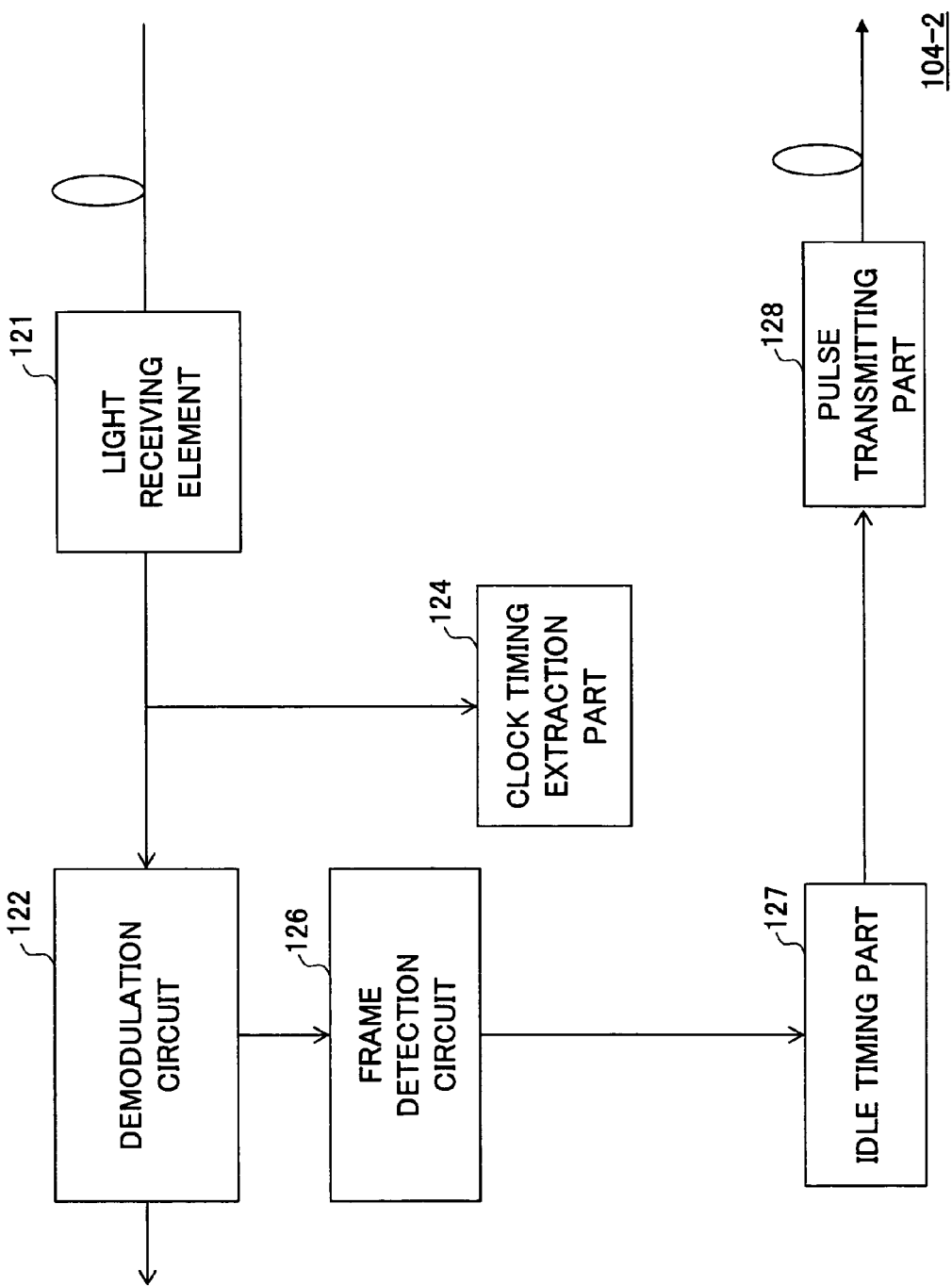
FIG. 19 is a diagram showing a second configuration of the receiving part included in the receiver station according to the first embodiment of the present invention.

In addition, by configuring a receiving part 104-2 included in the receiver station as shown in FIG. 19, a receiving part 104-2 can transmit the backward alternating pulse at a longer transmission interval. FIG. 19 is a diagram showing a second configuration of the receiving part 104-2 included in the receiver station according to the first embodiment of the present invention. It should be noted that the second configuration of the receiving part 104-2 is similar to the first configuration of the receiving part 104-1 other than some parts in the second configuration in FIG. 19, and explanation thereof will be appropriately omitted.

The receiving part 104-2 in FIG. 19 includes the light receiving element 121, the demodulation circuit 122, a clock timing extraction part 124, a frame detection circuit 126, an idle timing part 127, and a pulse transmitting part 128.

The light receiving element 121 receives an optical signal from the transmitter station 200 through the optical CIR or optical wavelength filter 103. The light receiving element 121 converts the optical level of the optical signal received from the transmitter station 200 into the electric level, and transmits the electric level to the demodulation circuit 122 and the clock timing extraction part 124.

The clock timing extraction part 124 extracts a clock from the electric level from the light receiving element 121. The demodulation circuit 122 demodulates the electric level and outputs the electric level being demodulated as a demodulation signal. The frame detection circuit 126 detects a frame of the demodulation signal received from the demodulation circuit 122, and informs the frame to the idle timing part 127.

The idle timing part 127 detects an unused time slot prepared beforehand, by using the frame informed from the frame detection circuit 126. The idle timing part 127 informs the unused time slot being detected, to the pulse transmitting part 128. Therefore, the transmitting part 128 can transmit the backward 10 alternating pulse by using the unused time slot prepared beforehand.

Accordingly, in the second configuration of the receiving part 104-2 in FIG. 19, since the backward 10 alternating pulse can be transmitted during the unused time slot prepared beforehand, even if a communication error occurs during the unused time slot prepared beforehand, any communication in other time slots cannot be influenced.

In general, SONET (Synchronous Optical NETwork) and a like prepare the unused overhead and the like. Since an error within the unused overhead is separately managed, there is no influence to a communication. In SONET and the like, state information is consecutively transmitted by management information periodically. Thus, even if one of the management information is lost in SONET and the like, there is no influence to management. In addition, since a digital wrapper technology of SONET and the like has a FEC (Forward Error Correction) function, the communication can be sufficiently conducted in the above-described management.

Figure 20:
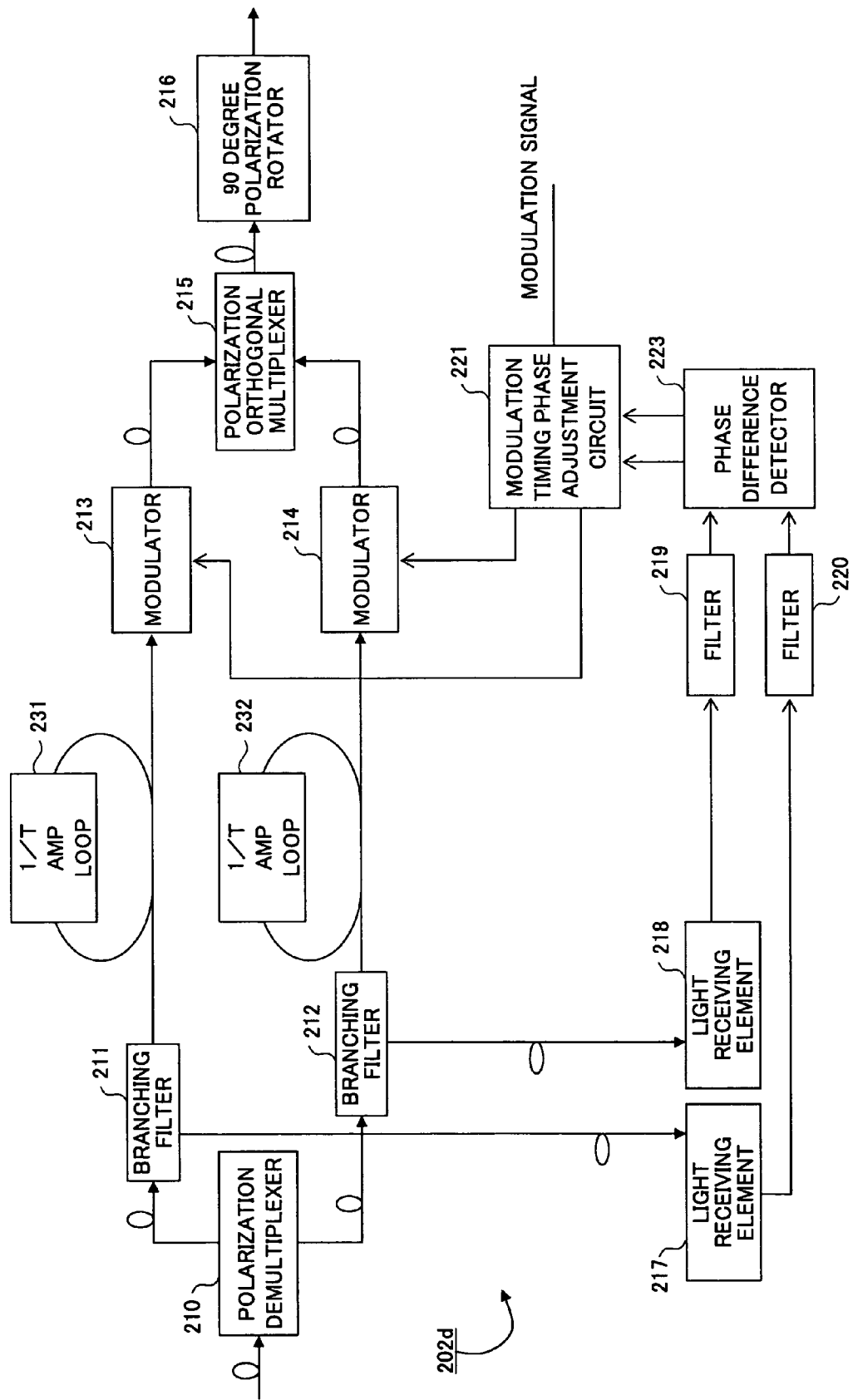
FIG. 20 is a diagram showing a fourth configuration of the modulation part according to the present invention.

On the other hand, since the transmission interval of the backward 10 alternating pulse becomes longer in the transmitter station 200, a configuration as shown in FIG. 20 is required to occur a direct light having the same wavelength as the backward 10 alternating pulse. FIG. 20 is a diagram showing a fourth configuration of the modulation part according to the present invention. It should be noted that the fourth configuration of the modulation part 202d is similar to the configuration of the modulation part 202a other than some parts of the modulation part 202d, and explanation thereof will be omitted.

The modulation part 202d includes the polarization demultiplexers 210, the branching devices 211 and 212, the modulators 213 and 214, the polarization orthogonal multiplexer 215, the 90 degree polarization rotator 216, the light receiving elements 217 and 218, the filters 219 and 220, the modulation timing phase adjustment circuit 221, a phase difference detector 223, and optical loop circuits 231 and 232.

Different from the modulation part 202a in FIG. 7, the modulation part 202d in FIG. 20 includes the optical loop circuits 231 and 232, and the phase difference detector 223. The optical loop circuit 231 and 232 are arranged between the branching devices 211 and 212 and the modulators 213 and 214, respectively. The phase difference detector 223 is arranged between the filters 219 and 220 and the modulation timing phase adjustment circuit 221.

The optical loop circuits 231 and 232 can generates a successive pulse sequence of the same wavelength as the backward 10 alternating pulse, from the backward 10 alternating pulse having a longer transmission interval, and transmit the successive pulse sequence to the modulators 213 and 214.

Figure 21:
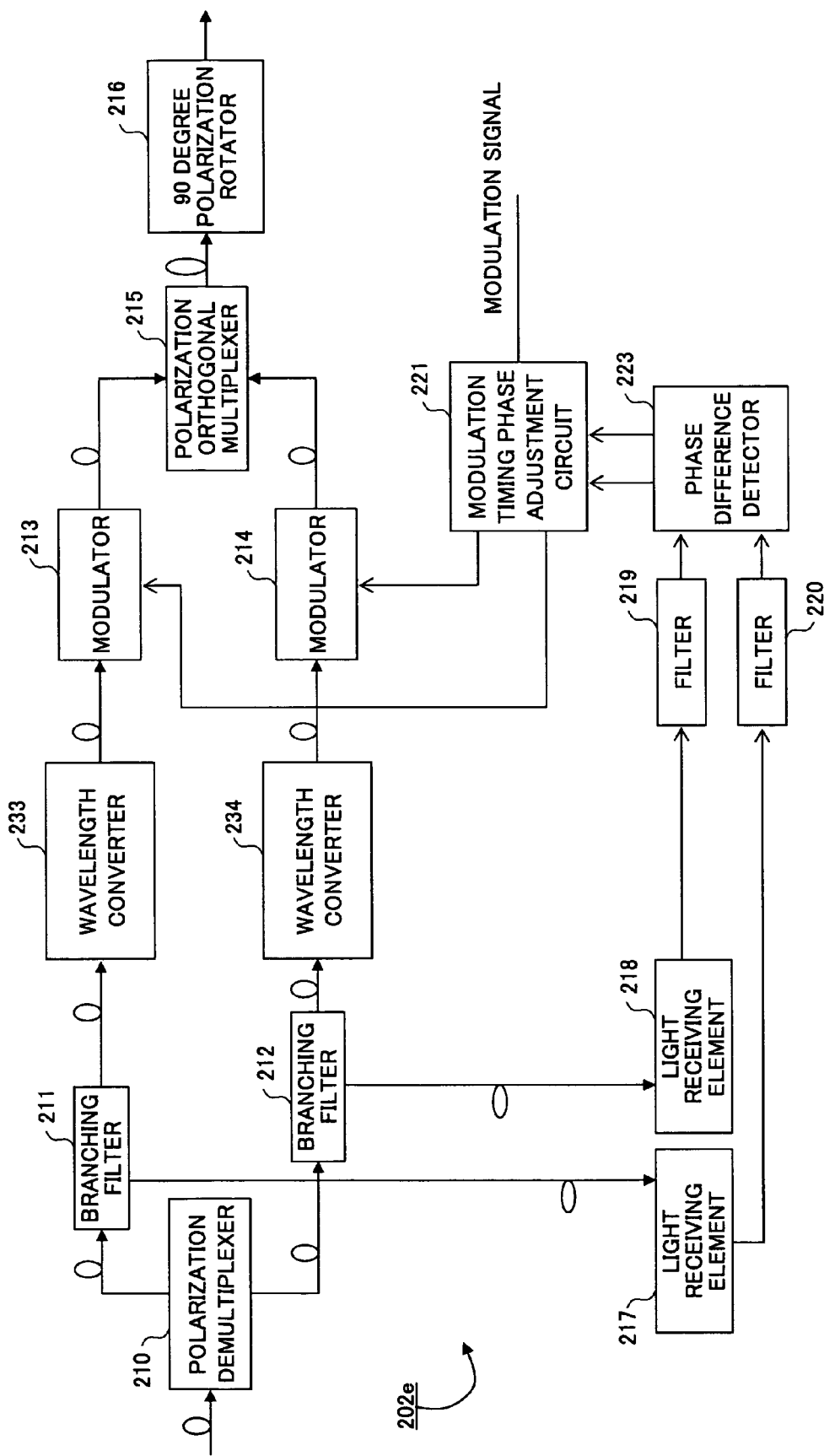
FIG. 21 is a diagram showing a fifth configuration of the modulation part according to the first embodiment of the present invention.

Alternatively, the transmitter station 200 may change the wavelength of the backward 10 alternating pulse having the longer transmission interval, and may generate a direct light having the same wavelength as the backward 10 alternating pulse as shown in FIG. 21. FIG. 21 is a diagram showing a fifth configuration of the modulation part according to the first embodiment of the present invention. The fifth configuration of the modulation part 202e is similar to the modulation part 202a in FIG. 7 other than some parts of the modulation part 202e, and explanation thereof will be approximately omitted.

The modulation part 202e includes the polarization demultiplexer 210, the branching devices 211 and 212, the modulators 213 and 214, the polarization orthogonal multiplexer 215, the 90 degree polarization rotator 216, the light receiving elements 217 and 218, the filters 219 and 220, the modulation timing phase adjustment circuit 221, the phase difference detector 223, and wavelength converters 233 and 234. For example, the wavelength converters 233 and 234 are devices for converting a wavelength of light by using a nonlinear effect such as a four-wave mixing (FWM) effect.

Different from the modulation part 202a, the modulation part 202e in FIG. 21 includes the wavelength converters 233 and 234. The wavelength converters 233 and 234 are arranged between the branching devices 211 and 212, and the modulators 213 and 214. The phase difference detector 223 is arranged between the filters 219 and 220, and the modulation timing phase adjustment circuit 221.

The wavelength converters 233 and 234 can generate a successive pulse sequence having the same wavelength as the backward 10 alternating pulse by converting the wavelength of the backward 10 alternating pulse having the longer transmission interval, and can transmit the successive pulse sequence to the modulators 213 and 214. The modulation part 202e in FIG. 21 can effectively eliminate a crosstalk shown in FIG. 17.

Figure 22:
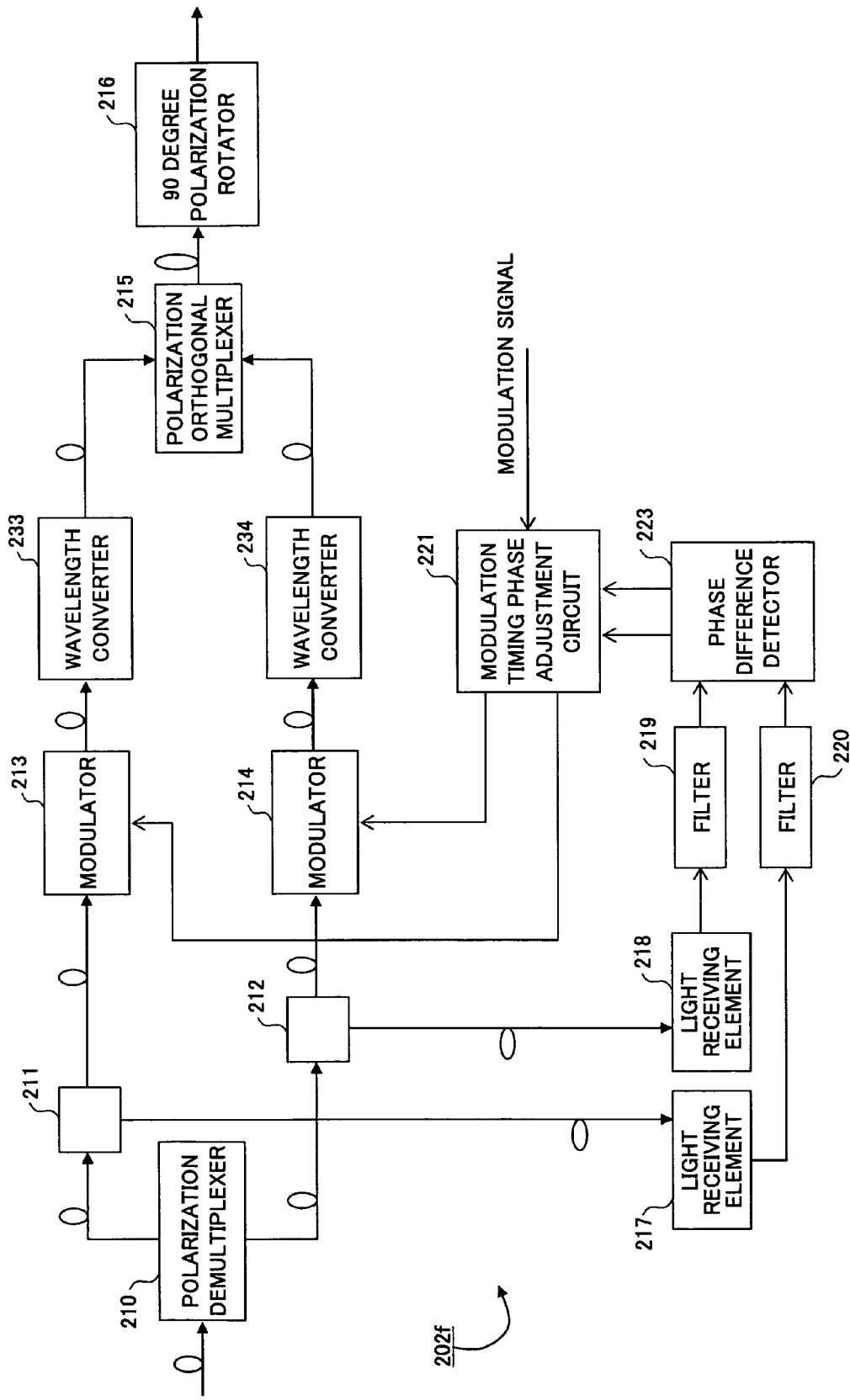
FIG. 22 is a diagram showing a sixth configuration of the modulation part according to the first embodiment of the present invention.

In the modulation part 202e in FIG. 21, the wavelength converters 233 and 234 are arranged between the branching devices 211 and 212, and the modulators 213 and 214. Alternatively, in a modulation part 202f, as shown in FIG. 22, the wavelength converters 233 and 234 may be arranged between the modulators 213 and 214, and the polarization orthogonal multiplexer 215. FIG. 22 is a diagram showing a sixth configuration of the modulation part according to the first embodiment of the present invention.

Second Embodiment

Figure 23:
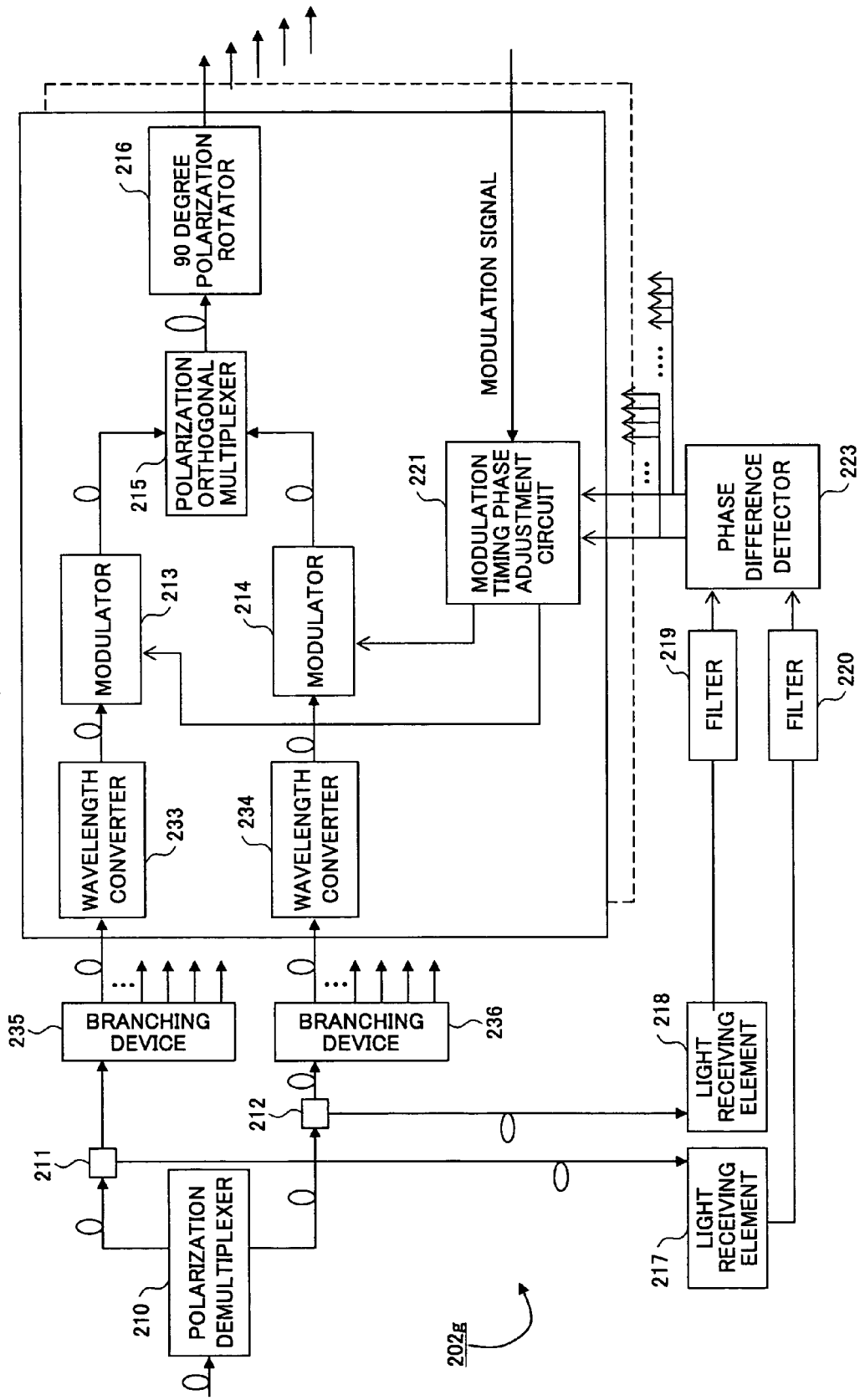
FIG. 23 is a diagram showing a seventh configuration of the modulation part according to a second embodiment of the present invention.

In the optical communication system in the first embodiment, the backward 10 alternating pulse is transmitted for each wavelength from the receiver station 100. Alternatively, by configuring the modulation part 202 of the transmitter station 200, it is not required to transmit the backward 10 alternating pulse for each wavelength. FIG. 23 is a diagram showing a seventh configuration of the modulation part according to a second embodiment of the present invention.

The modulation part 202g includes the polarization demultiplexer 210, the branching devices 211 and 212, the modulators 213 and 214, the polarization orthogonal multiplexer 215, the 90 degree polarization rotator 216, the light receiver elements 217 and 218, the filters 219 and 220, the modulation timing phase adjustment circuit 221, the phase difference detector 223, the wavelength converters 233 and 234, and branching devices 235 and 236.

First, different from the modulation part 202e in FIG. 21, in the modulation part 202g in FIG. 23, the branching devices 235 and 236 are arranged between the branching devices 211 and 212, and the wavelength converters 233 and 234. Second, different from the modulation part 202e in FIG. 21, in the modulation part 202g, for each wavelength, the wavelength converters 233 and 234, the modulators 213 and 214k, the polarization orthogonal multiplexer 215, the 90 degree polarization rotator 216, and the modulation timing phase adjustment circuit 221 are arranged.

The modulation part 202g in FIG. 23 can generates the received backward 10 alternating pulse for each wavelength by the branching devices 235 and 236 after the received backward 10 alternating pulse is divided by the polarization demultiplexer 210.

Figure 24:
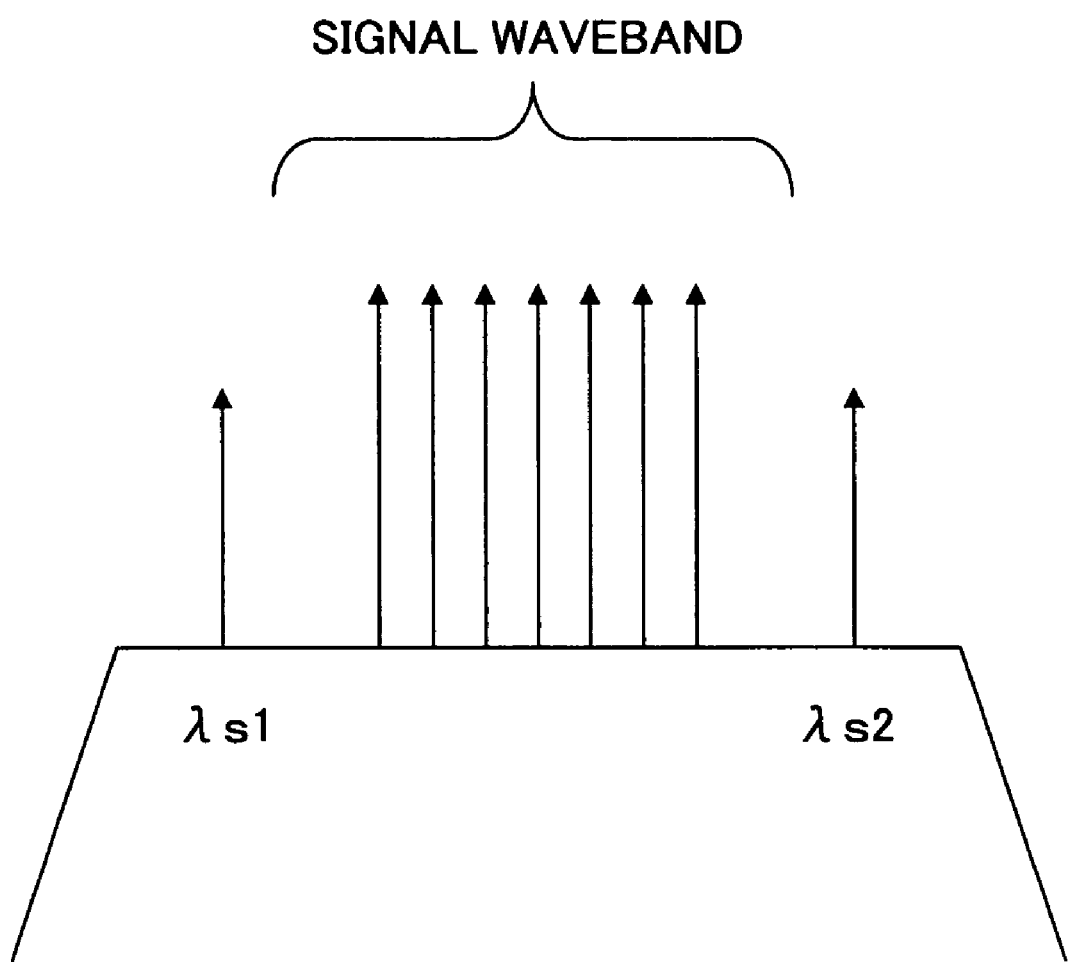
FIG. 24 is a diagram showing the received backward 10 alternating pulse using two wavelengths according to the second embodiment of the present invention.

Alternatively, as shown in FIG. 24, the received backward 10 alternating pulse can be formed by two wavelengths. FIG. 24 is a diagram showing the received backward 10 alternating pulse using two wavelengths according to the second embodiment of the present invention.

Figure 25:
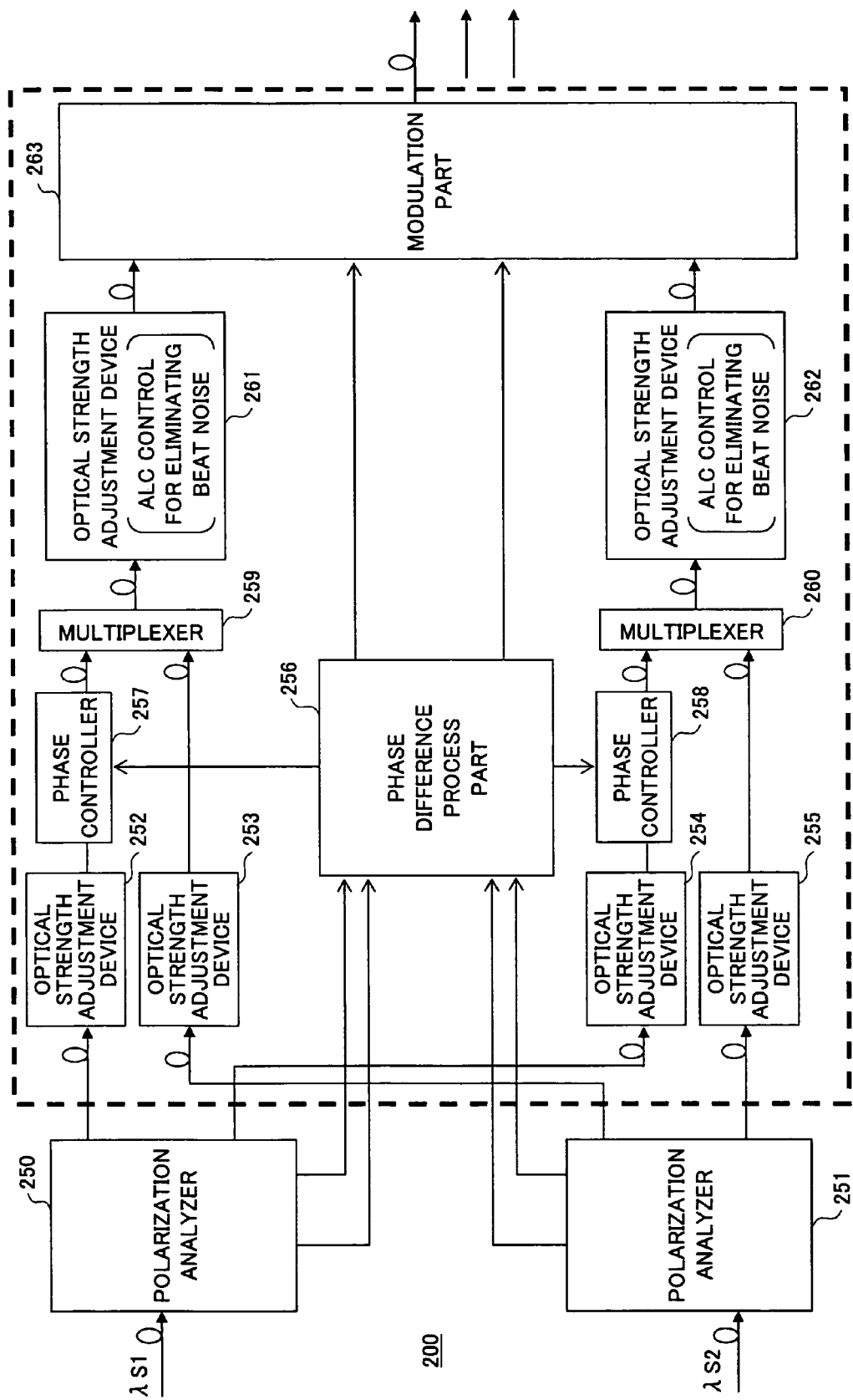
FIG. 25 is a diagram showing a first configuration of the transmitter station capable of canceling wavelength dependence according to the second embodiment of the present invention.

FIG. 25 is a diagram showing a first configuration of the transmitter station capable of canceling wavelength dependence according to the second embodiment of the present invention. A transmitter station 200a includes polarization analyzers 250 and 251, optical strength adjustment devices 252 through 255, the phase difference process part 256, phase controllers 257 and 258, multiplexers 259 and 260, optical strength adjustment devices 261 and 262, and a modulation part 263.

For example, when the receiver station 100 modulates two wavelengths of light into the backward 10 alternating pulse, and transmits the backward 10 alternating pulse to the transmitter station 200a, the polarization analyzers 250 and 251 receives the received backward 10 alternating pulses having wavelengths $\lambda s1$ and $\lambda s2$ from the receiver station 100, respectively.

Figure 26:
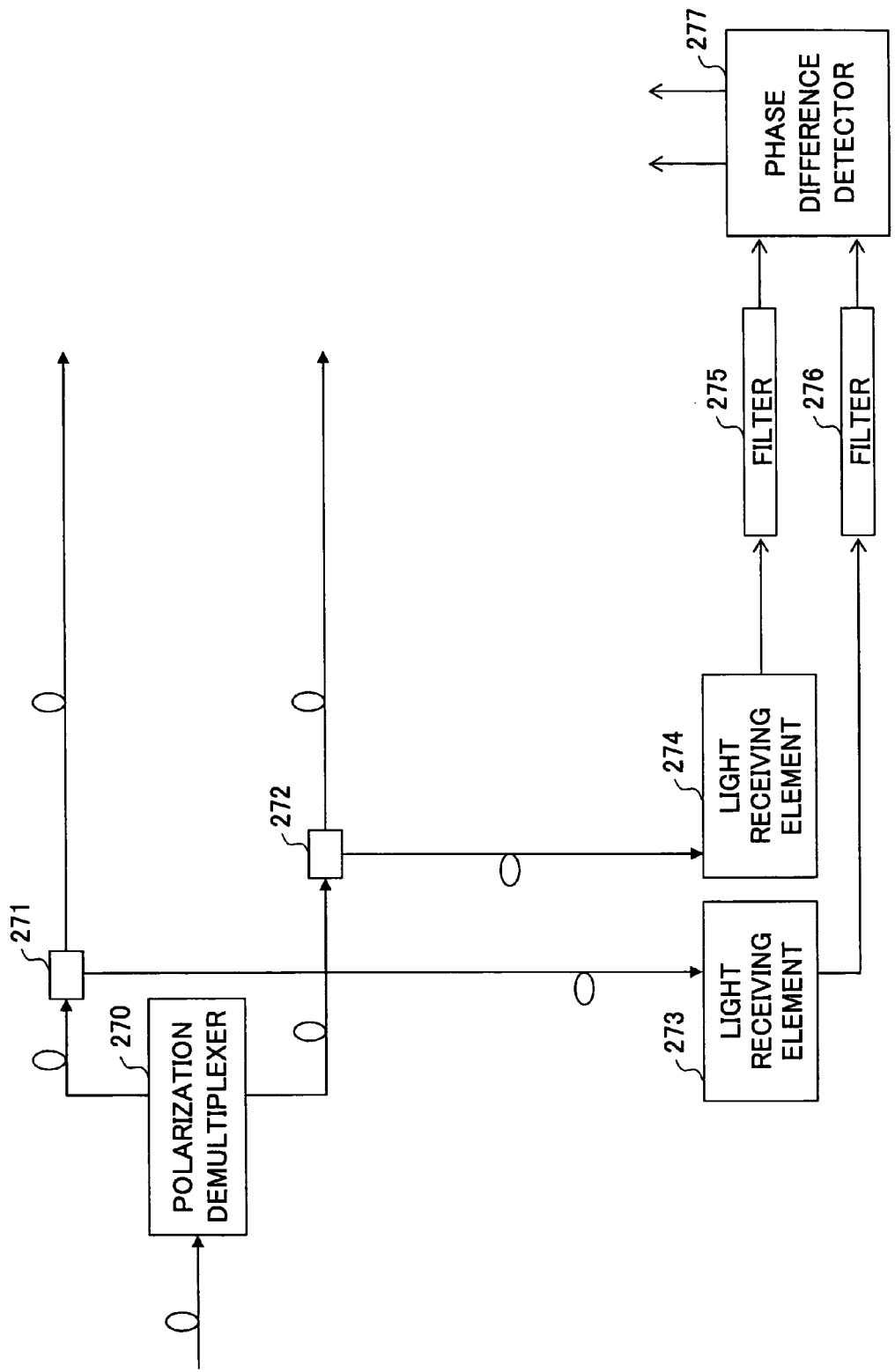
FIG. 26 is a diagram showing a first configuration of the polarization analyzer according to the second embodiment of the present invention.

FIG. 26 is a diagram showing a first configuration of the polarization analyzer according to the second embodiment of the present invention. Each of the polarization analyzers 250 and 251 includes a polarization demultiplexer 270, branching devices 271 and 272, light receiving elements 273 and 274, filters 275 and 276, and a phase difference detector 277.

The polarization demultiplexer 270 separates the received backward 10 alternating pulse into two polarizations. The polarization demultiplexer 270 transmits the received backward 10 alternating pulse being separated into two polarizations, to the optical strength adjustment devices 252, 253, 254, and 255 through the branching devices 271 and 272. The branching devices 271 and 272 branch the received backward 10 alternating pulse and transmit the received backward 10 alternating pulse being branched to the respective light receiving elements 273 and 274.

The light receiving elements 273 and 274 convert the optical level of the received backward 10 alternating pulse into the electric level, and transmits the electric level to the respective filter 275 and 276. Each of the filters 275 and 276 extracts a clock from the electric level, and transmits to the phase difference detector 277. The phase difference detector 277 detects the phase difference of two polarizations separated by the polarization demultiplexer 270, and informs the phase difference as phase information to the phase difference process part 256 in FIG. 25.

Referring back to FIG. 25, the optical strength adjustment device 252 adjusts the optical level of the backward 10 alternating pulse, and transmits the backward 10 alternating pulse to the multiplexer 259 through the phase controller 257. The phase controller 257 controls a phase of the backward 10 alternating pulse by a control of the phase difference process part 256. The optical strength adjustment device 252 adjusts the optical level of the backward 10 alternating pulse, and transmits the backward 10 alternating pulse to the multiplexer 259. The multiplexer 259 multiplexes the backward 10 alternating pulse and transmits the backward 10 alternating pulse to the modulation part 263 through the optical strength adjustment device 261.

On the other hand, the optical strength adjustment device 254 adjusts the optical level of the backward 10 alternating pulse, and transmits the backward 10 alternating pulse to the multiplexer 260 through the phase controller 258. The phase controller 258 controls the phase of the backward 10 alternating pulse by a control of the phase difference process part 256. The optical strength adjustment device 255 adjusts the optical level of the backward 10 alternating pulse, and transmits the backward 10 alternating pulse to the multiplexer 260. The multiplexer 260 multiplexes the backward 10 alternating pulse, and transmits the backward 10 alternating pulse to the modulation part 263 through the optical strength adjustment device 262.

The phase difference process part 256 controls the phase controllers 257 and 258 so that the multiplexers 259 and 260 can multiplex the received backward 10 alternating pulses having the wavelengths λs1 and λs2, which are separated by the respective polarization analyzers 250 and 251.

Figure 27:
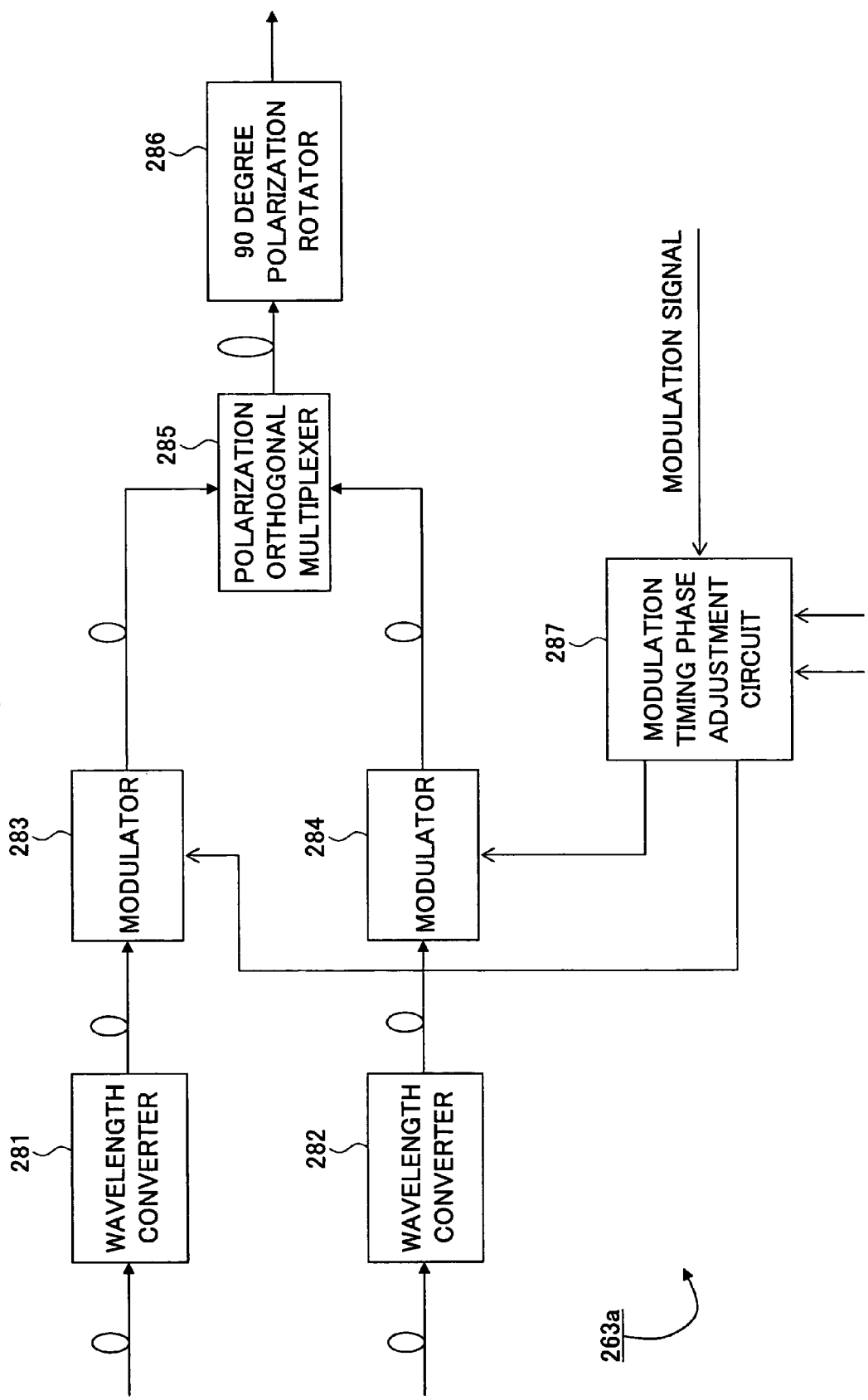
FIG. 27 is a diagram showing a first configuration of the modulation part in FIG. 25 according to the second embodiment of the present invention.

FIG. 27 is a diagram showing a first configuration of the modulation part in FIG. 25 according to the second embodiment of the present invention. The modulation part 263a in FIG. 27 includes wavelength converters 281 and 282, modulators 283 and 284, a polarization orthogonal multiplexer 285, a 90 degree polarization rotator 286, and a modulation timing phase adjustment circuit 287.

The modulators 283 and 284 receive the received backward 10 alternating pulse from the respective the optical strength adjustment devices 261 and 262 through the wavelength converters 281 and 282. Also, the modulators 283 and 284 receive a modulation signal from the modulation timing phase adjustment circuit 287. After the modulators 283 and 284 modulate the received backward 10 alternating pulse with the modulation signal, the modulators 283 and 284 transmit the received backward 10 alternating pulse as an optical signal to the polarization orthogonal multiplexer 285. The polarization orthogonal multiplexer 285 crosses and multiplexes the optical signals received from modulators 283 and 284, and transmits the multiplexed optical signal to the 90 degree polarization rotator 286. The 90 degree polarization rotator 286 rotates the polarization of the multiplexed optical signal at 90 degrees. The multiplexed optical signal, which polarization is rotated by the 90 degree polarization rotator 286, is output to the transmission channel 300.

Figure 28:
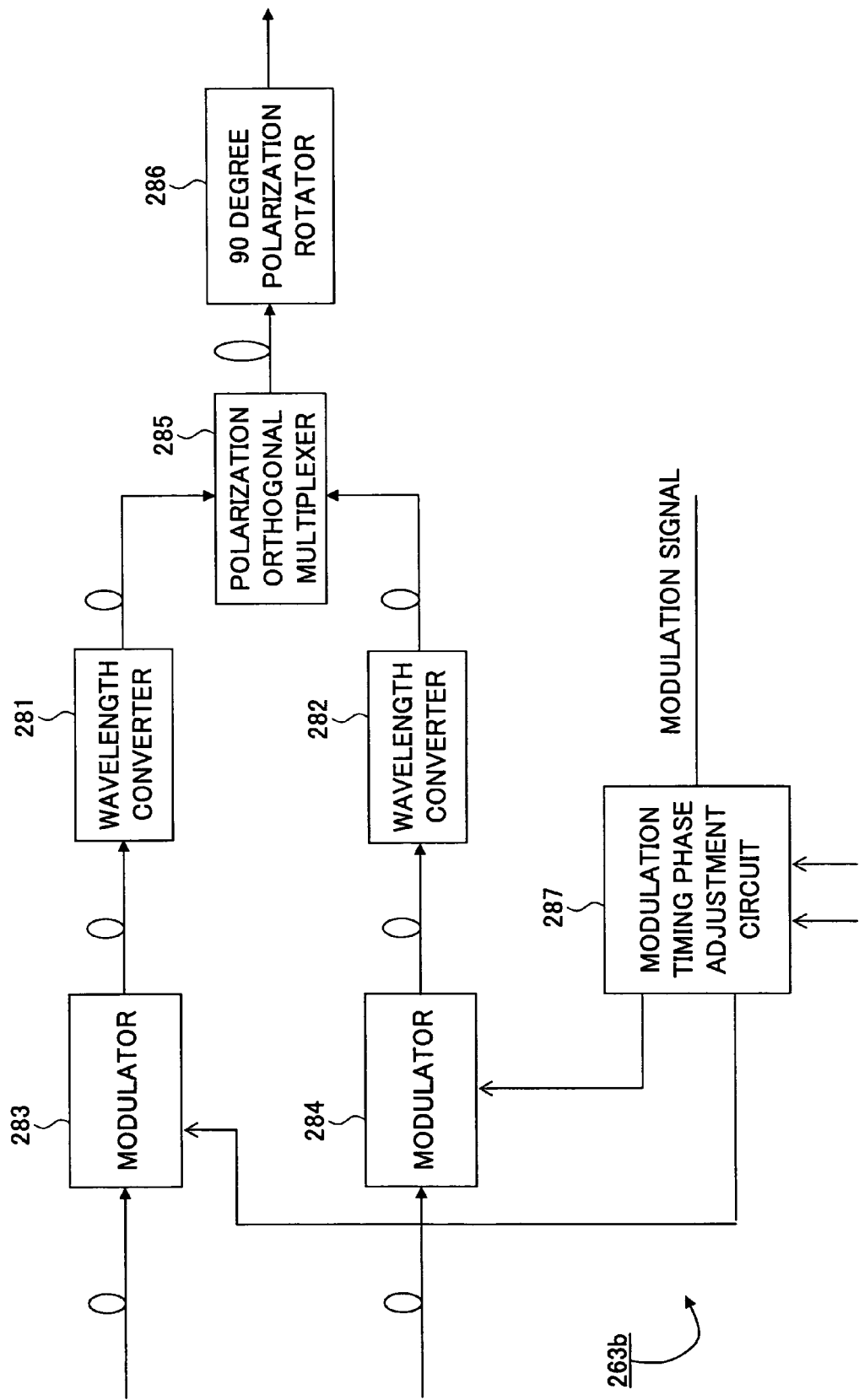
FIG. 28 is a diagram showing a second configuration of the modulation part in FIG. 25 according to the second embodiment of the present invention.

The modulation part 263 in FIG. 25 may be made up of as shown in FIG. 28. FIG. 28 is a diagram showing a second configuration of the modulation part in FIG. 25 according to the second embodiment of the present invention. Different from the modulation part 263a in FIG. 27, in the modulation part 263b in FIG. 28, the wavelength converters 281 and 282 are arranged at a post-stage rather than a pre-stage of the modulators 283 and 284.

That is, when it is considered that wavelengths λ of two polarization planes being orthogonal to each other, which are obtained from the first configuration for the polarization analyzers 250 and 251 in FIG. 26, show a linear relationship of the wavelengths λs1 and λs2 from the wavelengths λs1 and λs2, the linear relationship is expressed by an equation (1) as follows:

$$\lambda = k(\lambda s2 - \lambda s1) + \lambda s1 \quad (1)$$

In order to eliminate a beat fluctuation occurred by a difference between the wavelengths λs1 and λs2 when the wavelengths λs1 and λs2 are multiplexed, with respect to a gained optical output, the optical strength adjustment device may apply output constant control feedback, which is adjusted so as to cut a factor corresponding to the beat frequency in a following equation (2). In FIG. 25, two wavelengths are basic wavelengths when light, which wavelength is converted, is generated. Since it is required to generate the wavelengths in a condition in that optical waveforms are proportional to a sum of the optical electric field strengths, the FMW having a non-linear effect to the waveform conversion may be utilized.

$$C/\lambda s1 - C/\lambda s2 = \Delta f \quad (2)$$

Figure 29:
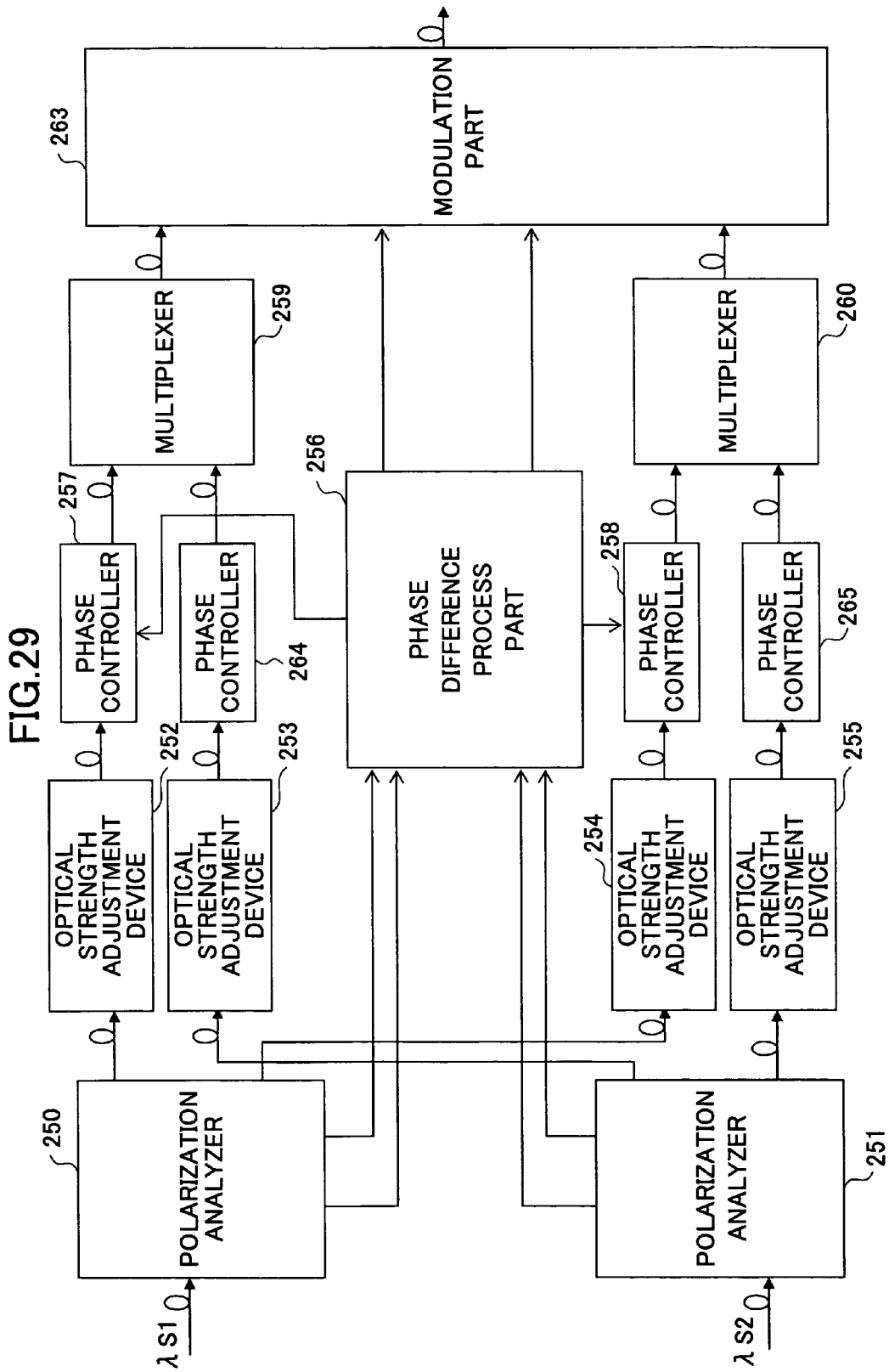
FIG. 29 is a diagram showing a second configuration of the transmitter station capable of canceling the wavelength dependence according to the second embodiment of the present invention.

Moreover, as shown in FIG. 29, by conducting the wavelength conversion for one of the wavelengths λs1 and λs2 at the wavelength converters 264 and 265, the same frequency may be input to the multiplexers 259 and 260. FIG. 29 is a diagram showing a second configuration of the transmitter station capable of canceling the wavelength dependence according to the second embodiment of the present invention. The transmitter station 200a in FIG. 25 and the transmitter station 200b in FIG. 29 are likely to be greater the sizes of those configurations accompanying with an increase of the number of wavelengths. Accordingly, as shown in FIG. 30, the wavelength converters may not be used.

Figure 30:
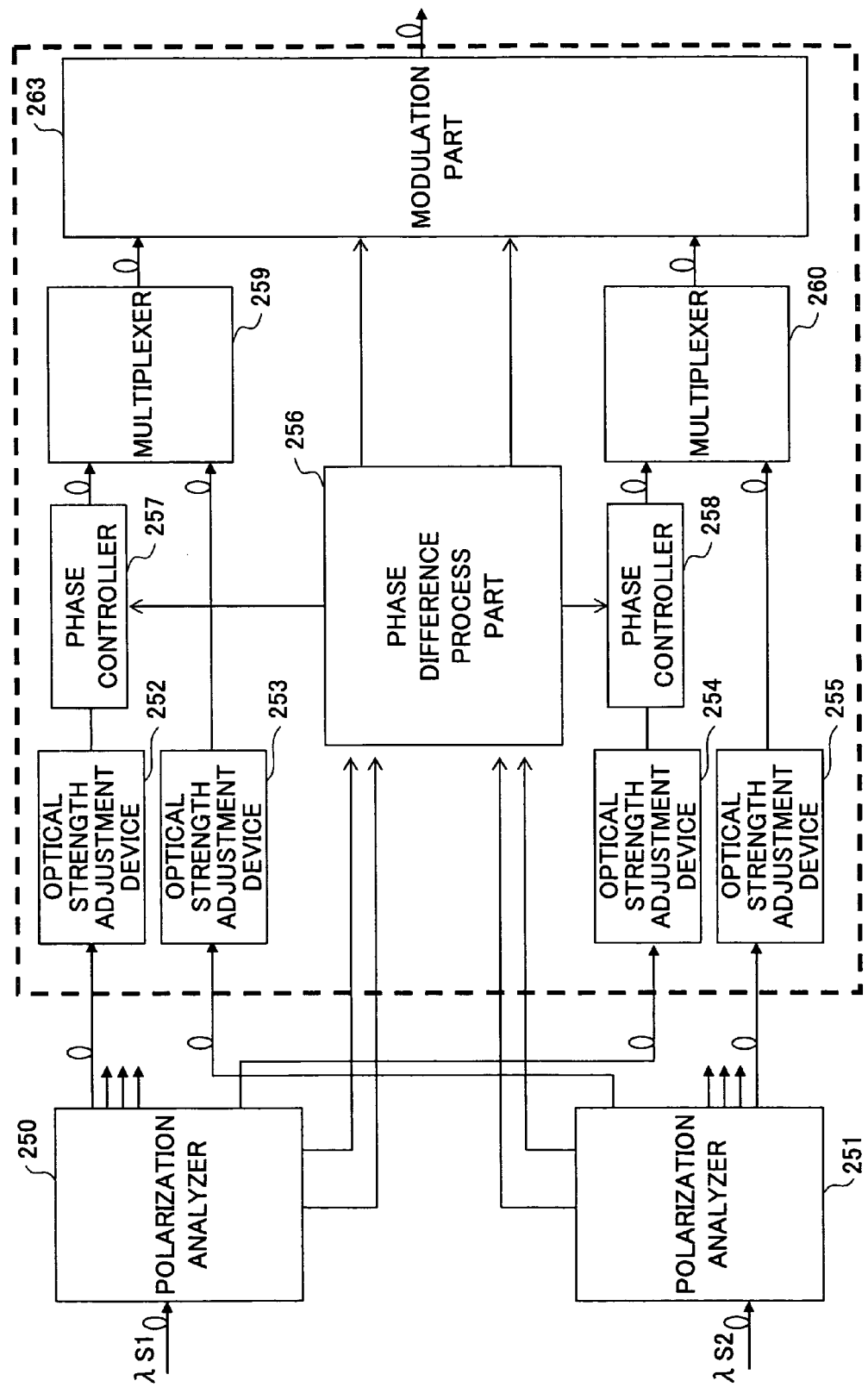
FIG. 30 is a diagram showing a third configuration of the transmitter station capable of canceling the wavelength dependence according to the second embodiment of the present invention.
Figure 31:
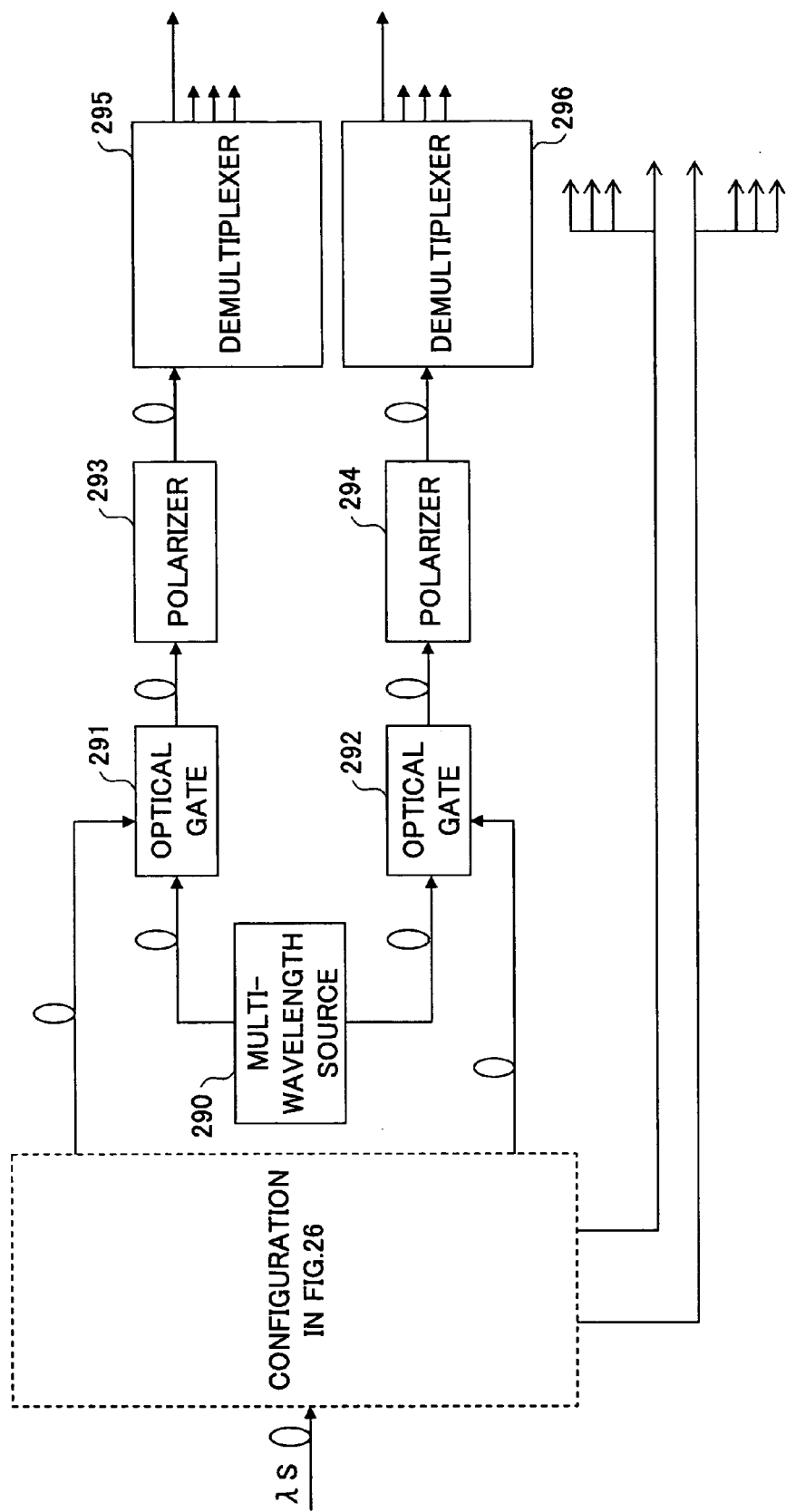
FIG. 31 is a diagram showing a second configuration of the polarization analyzer according to the second embodiment of the present invention.

FIG. 30 is a diagram showing a third configuration of the transmitter station capable of canceling the wavelength dependence according to the second embodiment of the present invention. The third configuration in FIG. 30 has features in a configuration and an output of the polarization analyzers 250 and 251. FIG. 31 is a diagram showing a second configuration of the polarization analyzer according to the second embodiment of the present invention. Each of the polarization analyzers 250 and 251 in FIG. 31 includes a multi-wavelength source 290, optical gates 291 and 292, polarizer 293 and 294, and multiplexers 295 and 296 in addition to the first configuration in FIG. 26.

Figure 32:
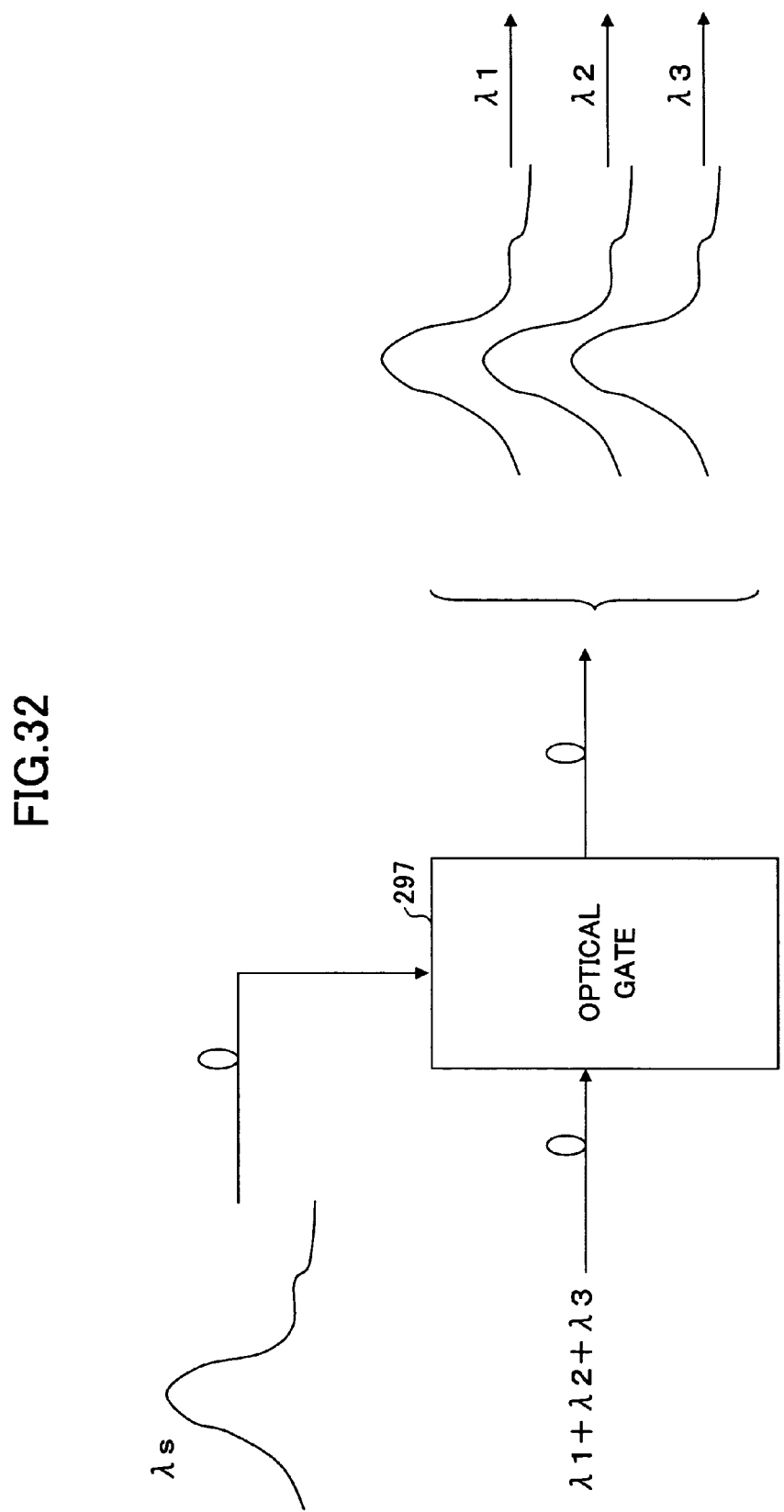
FIG. 32 is a diagram showing a first configuration of a multi-wavelength source according to the second embodiment of the present invention.

The multi-wavelength source 290 can be configured as shown in FIG. 32. FIG. 32 is a diagram showing a first configuration of the multi-wavelength source according to the second embodiment of the present invention. The multi-wavelength source 290 can be realized by an optical gate 297, which can conduct a strength modulation to the waveform for each wavelength as an optical waveform is received and can response at high speed. Also, the multi-wavelength source 290 can be realized in configuration in FIG. 33 and FIG. 34.

Figure 33:
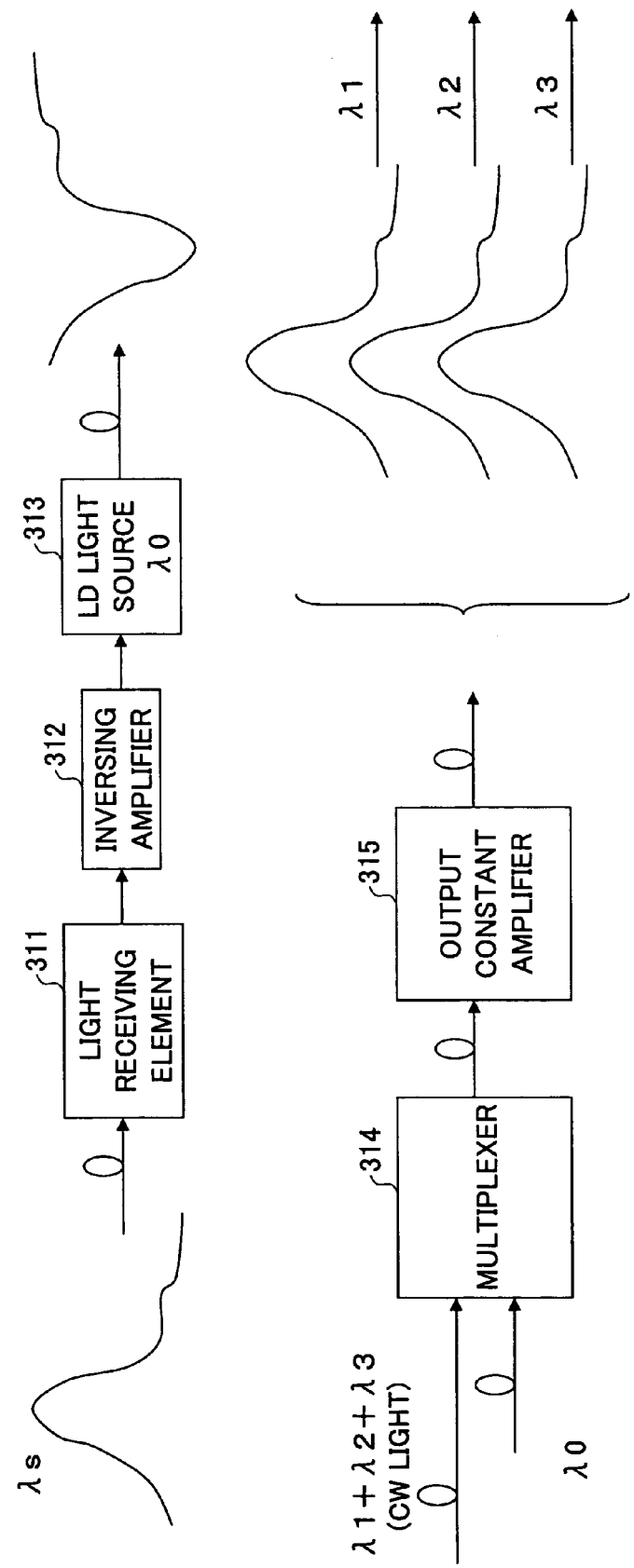
FIG. 33 is a diagram showing a second configuration of the multi-wavelength source according to the second embodiment of the present invention.
Figure 34:
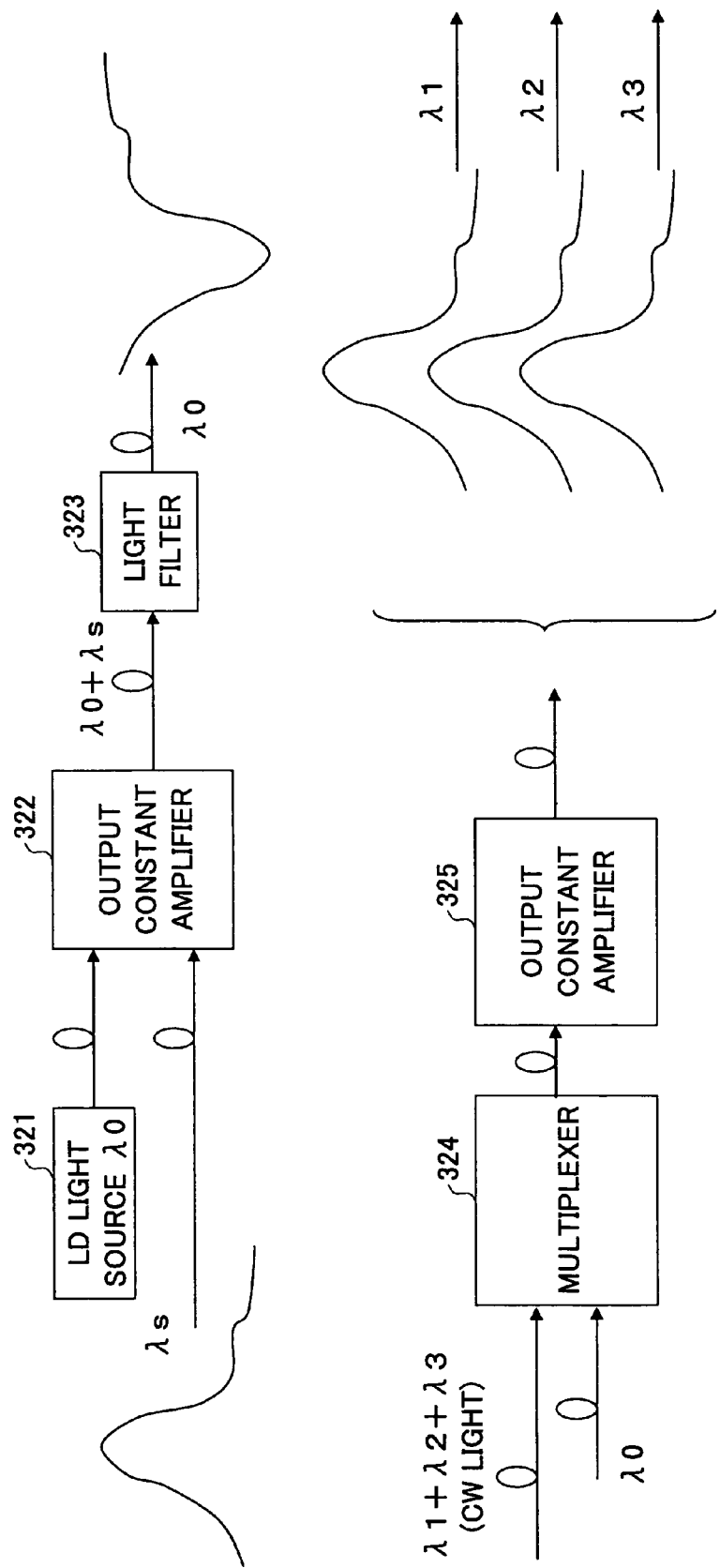
FIG. 34 is a diagram showing a third configuration of the multi-wavelength source according to the second embodiment of the present invention.

In FIG. 33, the multi-wavelength source 290 includes a light receiving element 311, an inversing amplifier 312, an LD light source 313, a multiplexer 314, and an output constant amplifier 315. In FIG. 34, the multi-wavelength source 290 includes an LD light source 321, an output constant amplifier 322, a light filter 323, a multiplexer 324, and an output constant amplifier 325.

Figure 35:
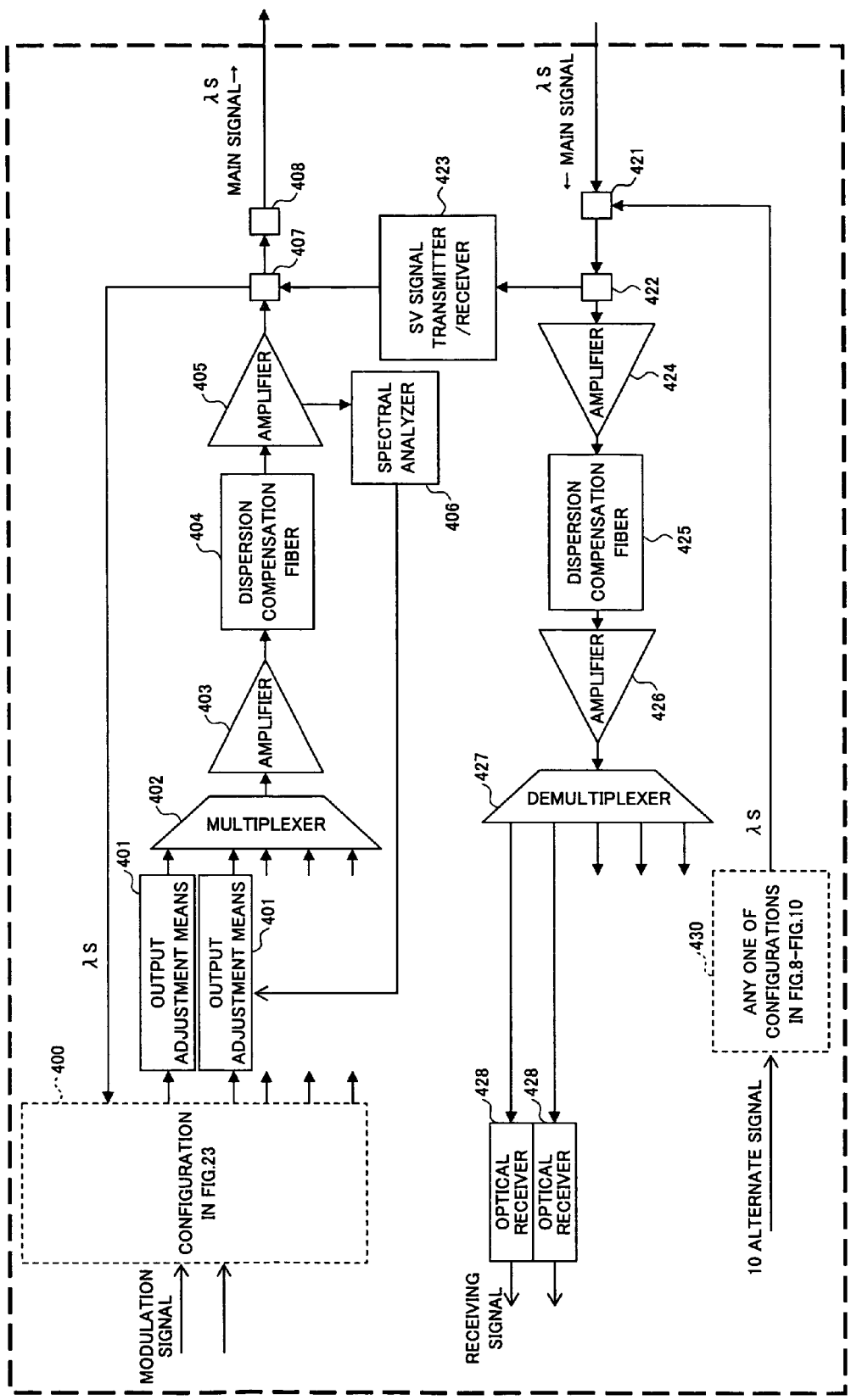
FIG. 35 is a diagram showing a first configuration of a terminal station to which the present invention is applied.
Figure 36:
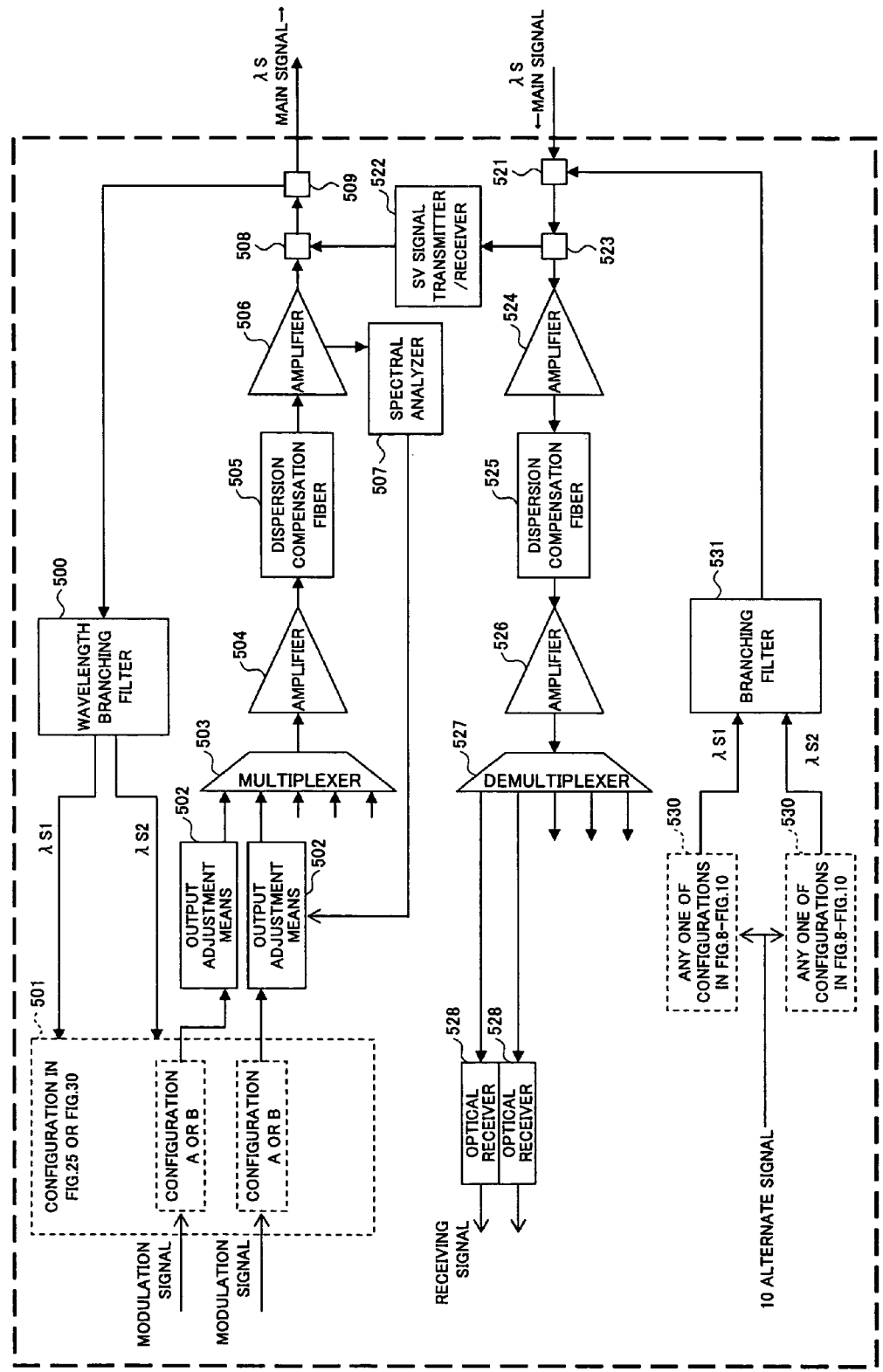
FIG. 36 is a diagram showing a second configuration of the terminal station to which the present invention is applied.

The terminal station to which the present invention is applied can be configured as shown in FIG. 35 or in FIG. 36.

In FIG. 35, the terminal station includes a configuration portion 400 as the configuration in FIG. 23, output adjustment means 401, 402, . . . , a multiplexer 402, an amplifier 403, a dispersion compensation fiber 404, am amplifier 405, a spectral analyzer 406, a multiplexer 407, a branching device 408, a multiplexer 421, a branching device 422, an amplifier 424, a dispersion compensation fiber 425, an amplifier 426, a demultiplexer 427, optical receivers 428, and a configuration portion 430 as any one of configurations in FIG. 8 through FIG. 10. In FIG. 36, the terminal station includes a wavelength branching filter 500, a configuration portion 501 as the configuration in FIG. 25 or FIG. 30, output adjustment means 502, an amplifier 504, a dispersion compensation fiber 505, am amplifier 506, a spectral analyzer 507, a multiplexer 508, and a branching device 509, and a multiplexer 521, an SV signal transmitter/receiver 5252, a branching device 523, an amplifier 524, a dispersion compensation fiber 525, an amplifier 526, a demultiplexer 527, optical receivers 528, configuration portions 530 as the configurations in any one of FIG. 8 through FIG. 10, and a branching filter 531.

Figure 37:
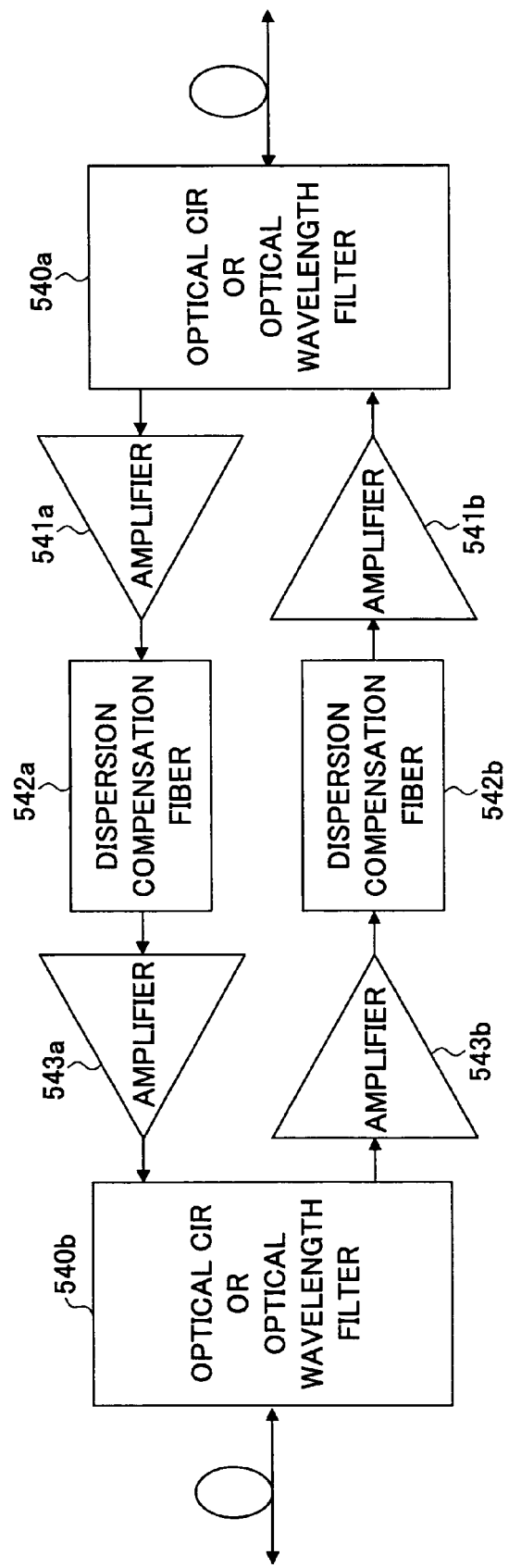
FIG. 37 is a diagram showing a first configuration of a relay station to which the present invention is applied.
Figure 38:
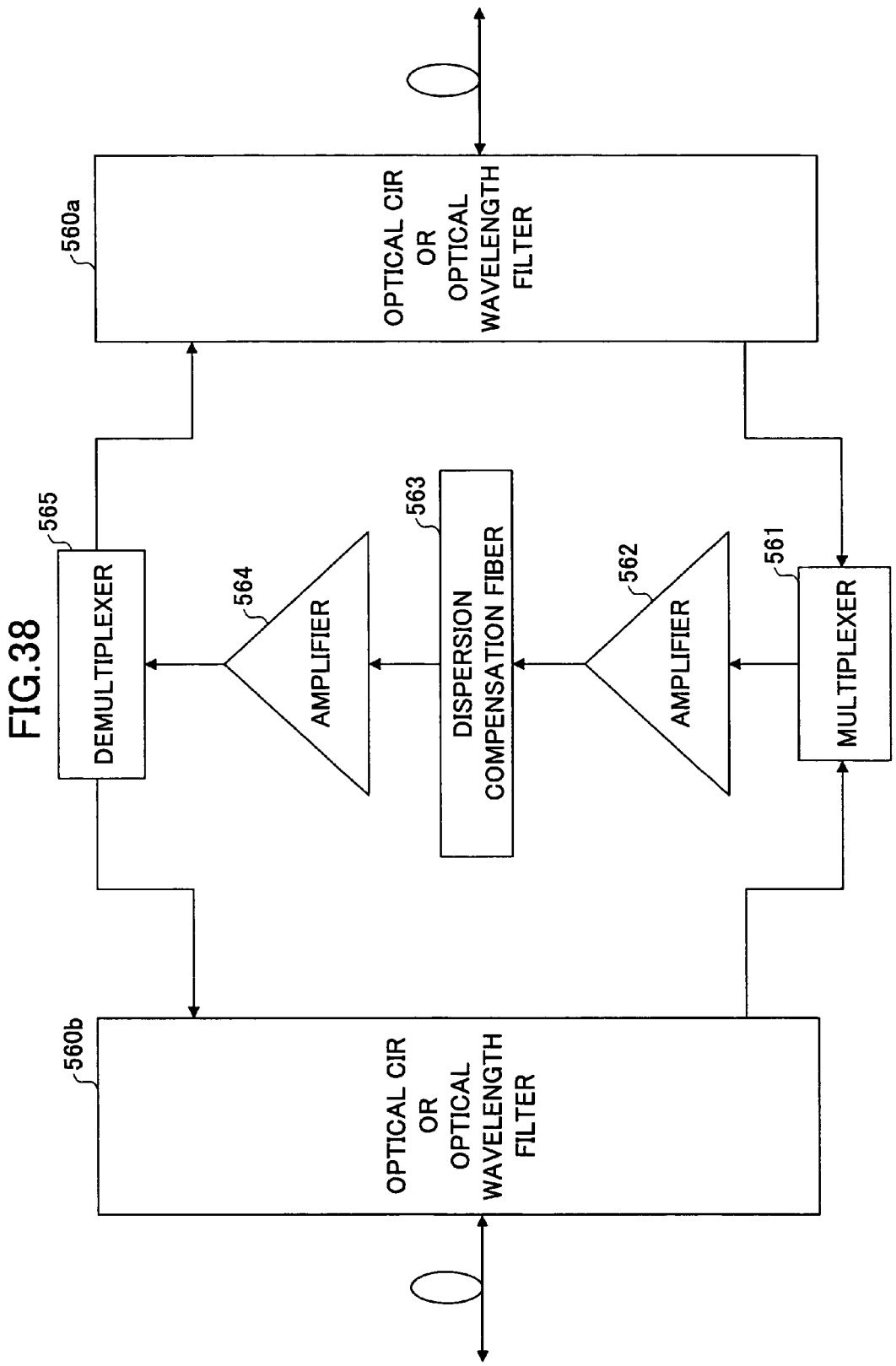
FIG. 38 is a diagram showing a second configuration of the relay station to which the present invention is applied.

Also, the relay station to which the present invention is applied can be configured as shown in FIG. 37 and FIG. 38. According to the present invention, it is possible to solve problems of the polarization dispersion and the polarization dependent loss, which are the critical problems to realize the optical communication system for transmitting the modulation signal at more than 40 Gbps in an existing optical fiber.

In FIG. 37, the relay station includes an optical CIR or optical wavelength filter 540a, an optical CIR or optical wavelength filter 540b, amplifiers 541 and 541b, dispersion compensation fibers 542a and 542b, and amplifiers 543a and 543b. In FIG. 38, the relay station includes an optical CIR or optical wavelength filter 56a, an optical CIR or optical wavelength filter 56b, a multiplexer 561, an amplifier 562, a dispersion compensation fiber 563, an amplifier 564, and a demultiplexer 565.

According to the present invention, it is possible to provide an optical communication system, a transmission deterioration compensation method, an optical transmitting system, and an optical receiving system, in which the polarization dispersion and the polarization dependent loss can be easily and inexpensively compensated.

The present invention is not limited to the specifically disclosed embodiments, and variations and modifications may be made without departing from the scope of the invention.

The present application is based on Japanese Priority Application No. 2005-096280 filed on Mar. 29, 2005, the entire contents of which are hereby incorporated by reference.

What is claimed is:

1. An optical communication system, comprising:
 a transmitter station;
 a communication channel connected to the transmitter station; and
 a receiver station connected to the communication channel, wherein,
 the receiver station is configured to output a pulse light to the communication channel, and
 the transmitter station is configured to modulate the pulse light received from the communication channel into a signal light, rotate a polarization plane of the signal light by 90 degrees, and transmit the signal light to the communication channel so as to reduce an influence of a polarization dispersion and a polarization loss from the communication,
 wherein a transmission interval in which a pulse signal from the receiver station is stopped is longer than a pulse width of the pulse signal.

2. The optical communication system as claimed in claim 1, wherein,
 the transmitter station includes a polarization demultiplexer configured to separate the pulse light from the communication channel into a first pulse light and a second pulse light, the first pulse light and the second pulse light having perpendicular polarization planes, and
 the transmitter station includes a polarization rotation part configured to rotate the polarization plane of the pulse light input to the polarization demultiplexer so that a delay difference of the first pulse light and the second pulse light increases.

3. The optical communication system as claimed in claim 2, wherein the transmitter station includes an optical strength adjustment part configured to separately adjust levels of the first pulse light and the second pulse light.

4. The optical communication system as claimed in claim 1, wherein,
 the receiver station is configured to output a wavelength division multiplexed (WDM) light including a plurality of pulse lights with different wavelengths, and
 the transmitter station demultiplexes the WDM light from the communication channel in to a plurality of demultiplexed pulse lights.

5. The optical communication system as claimed in claim 2, wherein the delay difference of the first pulse light and the second pulse light increases to become a maximum value.

6. A method comprising:
 sending a pulse light from a receiver station to a transmitter station via a communication channel;
 receiving the pulse light from the communication channel;
 modulating the pulse light into a signal light;
 rotating a polarization plane of the signal light by 90 degrees; and
 transmitting the signal light to the communication channel, wherein
 the modulating and rotating reduce an influence of polarization dispersion and polarization loss from the communication channel,
 wherein a transmission interval in which a pulse signal from the receiver station is stopped is longer than a pulse width of the pulse signal.

7. The method according to claim 6, further comprising:
 separating the pulse light from the communication channel into a first pulse light and a second pulse light, the first pulse light and the second pulse light having perpendicular polarization planes, and
 rotating the polarization plane of the pulse light input to the polarization demultiplexer so that a delay difference of the first pulse light and the second pulse light increases.

8. The method according to claim 7, wherein the delay difference of the first pulse light and the second pulse light increases to become a maximum value.

9. An optical transmitting station, comprising:
 a receiving unit configured to receive a pulse light from a receiver station via a communication channel;
 an output part configured to modulate the pulse light into a signal light; and
 a transmitting part configured to rotate a polarization plane of the signal light by 90 degrees, and to transmit the signal light to the communication channel to reduce the influence of the polarization dispersion and the polarization loss from the transmission channel,
 wherein a transmission interval in which a pulse signal from the receiver station is stopped is longer than a pulse width of the pulse signal.

10. The optical transmitting station according to claim 9, further comprising:
 a polarization demultiplexer configured to separate the pulse light from the communication channel into a first pulse light and a second pulse light, the first pulse light and the second pulse light having perpendicular polarization planes; and a polarization rotation part configured to rotate the polarization plane of the pulse light input to the polarization demultiplexer so that a delay difference of the first pulse light and the second pulse light increases.

11. The optical transmitting station according to claim 10, wherein the delay difference of the first pulse light and the second pulse light increases to become a maximum value.

12. An optical communication system wherein:

a pre-compensation is conducted for an influence of a polarization dispersion and a polarization loss, which an optical signal transmitted from a transmitter station to a receiver station receives from a communication channel, at a transmitter station; and the influence of the polarization dispersion and the polarization loss from the transmission channel is cancelled when the receiver station receives the optical signal, the transmitter station modulates light received from the receiver station with a modulation signal, rotates a polarization of the optical signal generated when the light is modulated, at 90 degrees, and transmits the optical signal to the receiver station, the light, which the transmitter station receives from the receiver station, is a pulse signal, and a transmission interval in which the pulse signal is stopped is longer than a pulse width of the pulse signal.

13. The optical communication system as claimed in claim 12, wherein the transmitter station generates another pulse signal within the transmission interval based on the pulse signal transmitted from the receiver station.

* * * * *